(12) United States Patent
Goodwin et al.

(10) Patent No.: US 11,544,772 B2
(45) Date of Patent: Jan. 3, 2023

(54) INTELLIGENT ITEM TRACKING AND EXPEDITED ITEM REORDERING BY STAKEHOLDERS

(71) Applicant: Staples, Inc., Framingham, MA (US)

(72) Inventors: Ian Goodwin, Boston, MA (US); Faisal Masud, Fall City, WA (US); Shiv Agarwal, Sammamish, WA (US); Ryan Bartley, Seattle, WA (US); M. Steven Walker, Andover, MA (US); Pratabkumar Vemana, Sammamish, WA (US)

(73) Assignee: Staples, Inc., Framingham, MA (US)

( * ) Notice: Subject to any disclaimer, the term of this patent is extended or adjusted under 35 U.S.C. 154(b) by 480 days.

(21) Appl. No.: 16/432,813

(22) Filed: Jun. 5, 2019

(65) Prior Publication Data

US 2019/0287160 A1 Sep. 19, 2019

Related U.S. Application Data

(62) Division of application No. 15/136,438, filed on Apr. 22, 2016, now Pat. No. 10,706,456.
(Continued)

(51) Int. Cl.
*G06Q 30/00* (2012.01)
*G06Q 30/06* (2012.01)

(52) U.S. Cl.
CPC ..... *G06Q 30/0637* (2013.01); *G06Q 30/0641* (2013.01)

(58) Field of Classification Search
CPC .................................................. G06Q 30/00
See application file for complete search history.

(56) References Cited

U.S. PATENT DOCUMENTS

| 5,960,411 A | 9/1999 | Hartman et al. |
| 6,473,739 B1 | 10/2002 | Showghi et al. |

(Continued)

FOREIGN PATENT DOCUMENTS

| CA | 2788131 A1 | 8/2011 |
| CA | 2928057 A1 | 10/2016 |

OTHER PUBLICATIONS

Amazon dashbutton1, "Quick start guide for dash button device", Amazon.com, dates Apr. 3, 2015. (Year: 2015).*
(Continued)

*Primary Examiner* — Mark A Fadok
(74) *Attorney, Agent, or Firm* — VLP Law Group LLP; Michel Bohn

(57) ABSTRACT

A computer-implemented method and system are described for ordering items within a zone of a physical location. An example method may include wirelessly receiving at a server via a computer network a unique identifier associated with a physical ordering device, the physical ordering device being remotely located from the server, retrieving, at the server from an information source, item information describing an item configured to be associated with the unique identifier of the physical ordering device, retrieving, at the server from the information source, shipping data including a physical location uniquely associated with the physical ordering device, and generating at the server a purchase request for re-ordering the item. The method may further include processing at the server the purchase request, and authorizing at the server shipment of the item to the physical location associated with the physical ordering device responsive to the processing of the purchase request.

11 Claims, 16 Drawing Sheets

Related U.S. Application Data

(60) Provisional application No. 62/151,389, filed on Apr. 22, 2015, provisional application No. 62/196,201, filed on Jul. 23, 2015.

(56) References Cited

U.S. PATENT DOCUMENTS

| | | | |
|---|---|---|---|
| 6,678,268 | B1 | 1/2004 | Francis et al. |
| 6,937,999 | B1 | 8/2005 | Haines et al. |
| 7,030,731 | B2 | 4/2006 | Lastinger et al. |
| 7,155,403 | B2 | 12/2006 | Cirulli et al. |
| 7,246,746 | B2 | 7/2007 | McNamara et al. |
| D551,038 | S * | 9/2007 | Evaimalo ............ D7/708 |
| 7,589,616 | B2 | 9/2009 | Klatsmanyi et al. |
| 7,698,169 | B2 | 4/2010 | Raccah et al. |
| 7,870,041 | B2 | 1/2011 | Henderson et al. |
| 7,881,987 | B1 | 2/2011 | Hart et al. |
| 7,908,185 | B2 | 3/2011 | Yeow et al. |
| 8,077,041 | B2 | 12/2011 | Stern et al. |
| 8,126,784 | B1 | 2/2012 | Agarwal |
| 8,161,119 | B2 | 4/2012 | Pirzada et al. |
| 8,390,442 | B2 | 3/2013 | Burns et al. |
| 8,636,208 | B2 | 1/2014 | Urban et al. |
| 8,639,549 | B2 | 1/2014 | Pathak et al. |
| 8,818,877 | B2 | 8/2014 | Blanchard, Jr. et al. |
| 8,908,185 | B2 | 12/2014 | Chen et al. |
| 9,036,792 | B2 | 5/2015 | Cacioppo et al. |
| 9,269,022 | B2 | 2/2016 | Rhoads et al. |
| D767,568 | S | 9/2016 | McWilliam |
| 9,443,370 | B2 | 9/2016 | Carson et al. |
| 9,514,589 | B2 | 12/2016 | Raina et al. |
| 9,576,412 | B2 | 2/2017 | Gudmundsson et al. |
| 9,602,172 | B2 | 3/2017 | Jackson et al. |
| 9,633,493 | B2 | 4/2017 | Raina et al. |
| 9,959,437 | B1 * | 5/2018 | Ramos ............ G06Q 30/0623 |
| 9,990,659 | B2 | 6/2018 | Shanmugam et al. |
| 10,217,529 | B2 | 2/2019 | Greco et al. |
| 10,285,003 | B2 | 5/2019 | Burch et al. |
| 10,438,276 | B2 | 10/2019 | Godsey et al. |
| 10,504,179 | B1 | 12/2019 | McGuire et al. |
| 10,531,304 | B2 | 1/2020 | Zeiler et al. |
| 10,542,382 | B2 | 1/2020 | Good et al. |
| 10,573,134 | B1 | 2/2020 | Zalewski et al. |
| 11,074,643 | B1 | 7/2021 | Ellithorpe et al. |
| 2002/0082042 | A1 | 6/2002 | Mark et al. |
| 2003/0030568 | A1 | 2/2003 | Lastinger et al. |
| 2007/0070831 | A1 | 3/2007 | Schobben et al. |
| 2007/0106570 | A1 | 5/2007 | Hartman et al. |
| 2010/0211636 | A1 | 8/2010 | Starkenburg et al. |
| 2011/0295724 | A1 | 12/2011 | Hill |
| 2012/0305655 | A1 | 12/2012 | Eckerdt |
| 2012/0330201 | A1 | 12/2012 | Turner et al. |
| 2013/0151355 | A1 | 6/2013 | Abromovitz et al. |
| 2013/0286046 | A1 | 10/2013 | Rodriguez |
| 2013/0325672 | A1 | 12/2013 | Odenheimer et al. |
| 2014/0214547 | A1 | 7/2014 | Signorelli et al. |
| 2014/0279188 | A1 | 9/2014 | Powell et al. |
| 2014/0279297 | A1 | 9/2014 | Morgan et al. |
| 2015/0016712 | A1 | 1/2015 | Rhoads et al. |
| 2015/0149307 | A1 | 5/2015 | Thukral |
| 2015/0164259 | A1 | 6/2015 | Eckerdt et al. |
| 2015/0302510 | A1 | 10/2015 | Godsey et al. |
| 2015/0348146 | A1 | 12/2015 | Shanmugam et al. |
| 2015/0382390 | A1 | 12/2015 | Wong et al. |
| 2016/0019888 | A1 | 1/2016 | Shigenaga et al. |
| 2016/0029148 | A1 * | 1/2016 | Jackson ............ H04W 8/005 455/41.2 |
| 2016/0055689 | A1 | 2/2016 | Raina et al. |
| 2016/0055690 | A1 | 2/2016 | Raina et al. |
| 2016/0055698 | A1 | 2/2016 | Gudmundsson et al. |
| 2016/0196526 | A1 | 7/2016 | Khalid et al. |
| 2016/0261917 | A1 | 9/2016 | Trollope et al. |
| 2016/0314518 | A1 | 10/2016 | Goodwin et al. |
| 2016/0371274 | A1 | 12/2016 | Ng et al. |
| 2017/0083965 | A1 | 3/2017 | Sun |
| 2017/0123596 | A1 | 5/2017 | Kashima |
| 2019/0295150 | A1 * | 9/2019 | High ............ G06Q 30/0641 |
| 2019/0318729 | A1 | 10/2019 | Chao et al. |

OTHER PUBLICATIONS

Amazondashbutton2, "Place it press it got it", Waybackmachine, dated Apr. 20, 2015. (Year: 2015).*
Amazondashbutton3, Pierce3,David, "Amazon is going to let your gadgets order groceries automatically". Wired, dated Mar. 31, 2015 (Year: 2015).*
Amazondashbutton4, "How dash replenishment service works", waybackmachine, dated Apr. 7, 2015. (Year: 2015).*
Amazondashbutton5, "How does dash button work", Quora.com, dates Apr. 1, 2015. (Year: 2015).*
Amazondashbutton6, Fletcher Gordon, "Amazon dash button is a first step towards internet of things that is actually useful", The Connection, dated Apr. 8, 2015. (Year: 2015).*
Amazondashbutton2, "Place it. Press it. Got it.", Waybackmachine, dated Apr. 20, 2015.
Amazondashbutton3, Pierce, David, "Amazon is going to let your gadgets order groceries automatically", Wired, dated Mar. 31, 2015.
Amazondashbutton4, "How Dash replenishment service works", Waybackmachine, dated Apr. 7, 2015.
Amazondashbutton5, "How does Amazon Dash button work", Quora.com, dated Apr. 1, 2015.
Amazondashbutton6, Fletcher, Gordon, "Amazon Dash is a first step towards internet of things that is activity useful", The Connection, dated Apr. 8, 2015.
Amazon Dash, Wikipedia, Wikimedia Foundation, Jul. 29, 2018, en.wikipedia.org/wiki/Amazon_Dash.
Sharifat, Amir, Flic—The Bluetooth Smart Bulton, Indiegogo, Nov. 19, 2017, www.indiegogo.com/products/flic-the-bluetooth-smart-bulton.
Freidman, Dick. "Inventory management tips" (2016) Supply House Times. (Year: 2016).
Bond, Ronald L. "What You Need to Know About Managing Retail Inventory" (2013) Entrepreneur.com (Year: 2013).
Williams, David. "QuickBooks Introduces New Reorder Points that Tell When Inventory is Running Low" Small Business Trends. SmallBizTrends.com (Year: 2017).
"iBeacon for Logistics: A Use Case in Facilities, Asset, & Inventory Management," download from http://apsima.com/blog/ibeacon-for-logistics-facilities-asset-inventory-management/> Apr. 17, 2015 (3 pages).
"StickNFind enterprise grade beacons helps streamline the process of monitoring, maintaining and managing the organization's valuable property that keep an organization running," download from https://www.sticknfind.com/enterprise.aspx> Apr. 17, 2015 (6 pages).
Qstock, "Inventory Audit Checklist", QStock Inventory, dated Jun. 6, 2015.

* cited by examiner

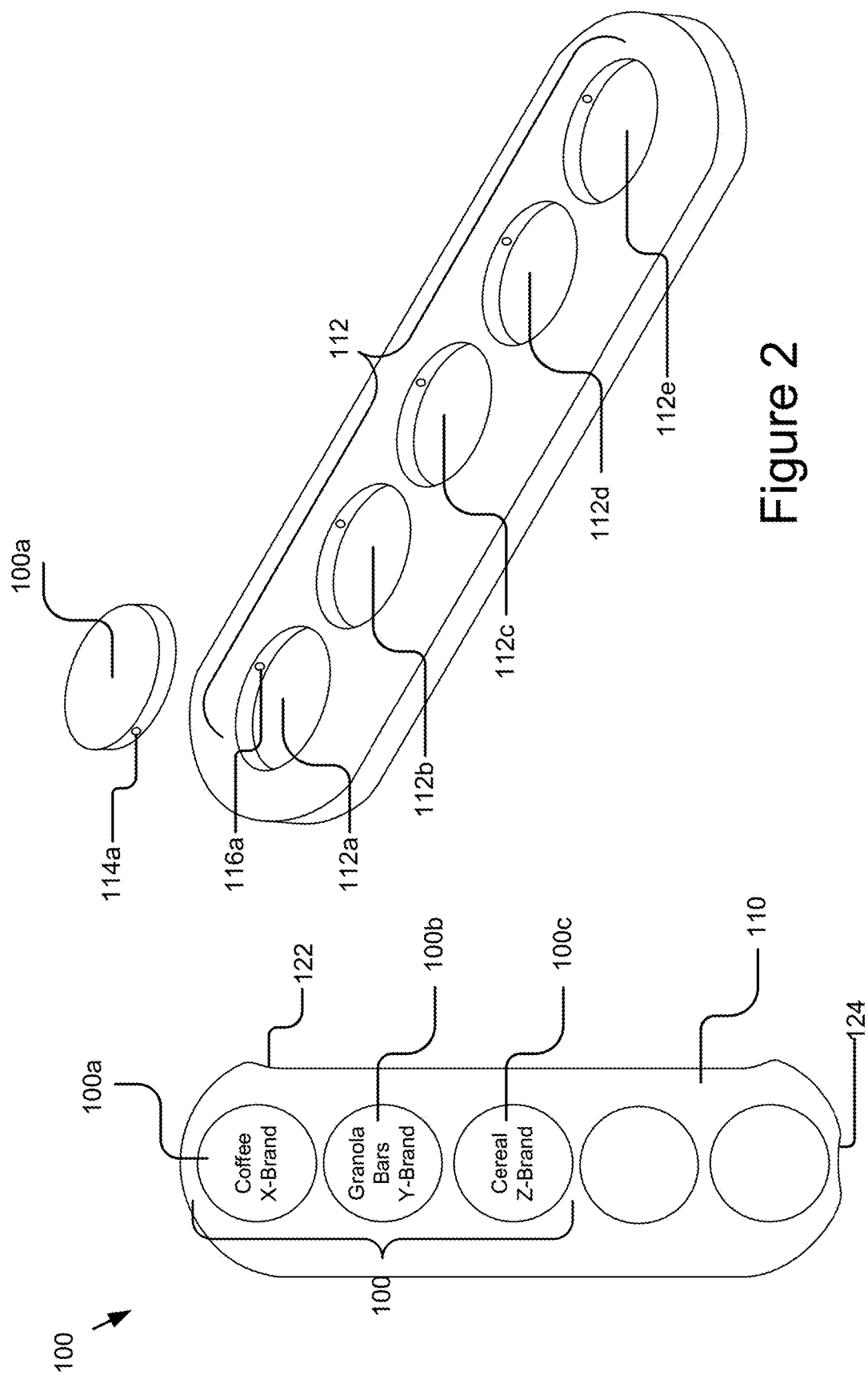

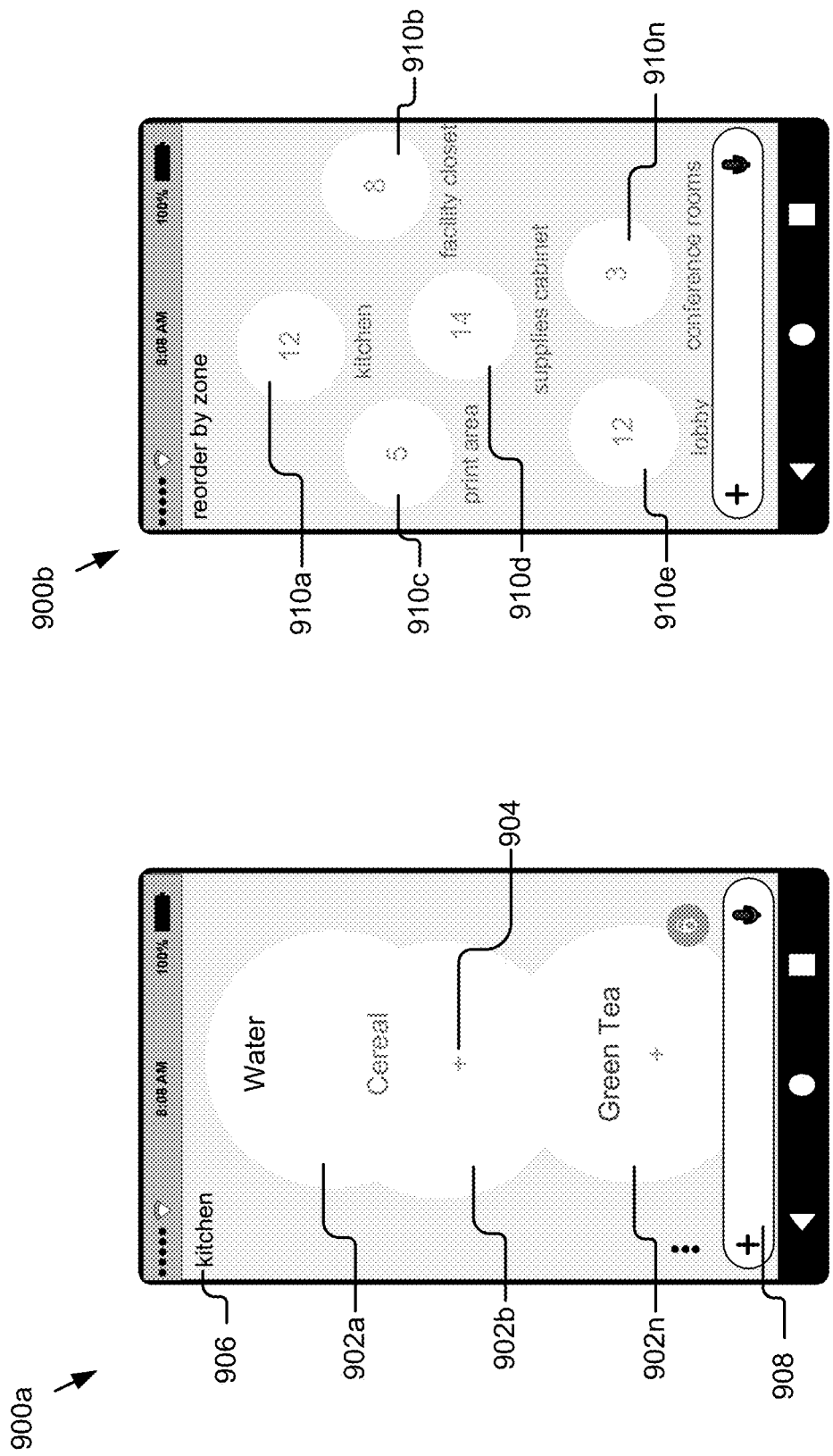

INTELLIGENT ITEM TRACKING AND EXPEDITED ITEM REORDERING BY STAKEHOLDERS

CROSS-REFERENCE TO RELATED APPLICATIONS

This application is a divisional of U.S. patent application Ser. No. 15/136,438, entitled "Intelligent Item Tracking and Expedited Item Reordering by Stakeholders", filed on Apr. 22, 2016, which claims the benefit under 35 U.S.C. § 119(e) of U.S. Provisional Application No. 62/151,389, entitled "Intelligent Item Tracking and Expedited Item Reordering by Stakeholders", filed on Apr. 22, 2015, and U.S. Provisional Application No. 62/196,201, entitled "Item Ordering System", filed on Jul. 23, 2015, the entire contents of which are incorporated herein by reference.

BACKGROUND

The present disclosure relates to technology for, among other things, providing intelligent item tracking and expedited item reordering by stakeholders.

The use of beacons in retail and e-commerce is dramatically changing the shopping experience for users. In the past, users frequenting retail establishments browsed through merchandise placed on the sales floor. In some cases, a customer would select an item for purchase only to then find out from the staff that the item is out of stock or not available in his or her size. As a result, the customer would leave the establishment frustrated with little recourse other than to return to the establishment of a later time or visit a competitor.

More recently, however, some retailers have begun installing beacons in their brick-and-mortar stores that are capable of identifying the customers entering the stores and pushing real-time notifications to the mobile devices of those customers to incentivize those customers to purchase items that are in-stock and/or on promotion during their visits. In addition, beacons are sometimes placed adjacent to certain products and when the users browse those products (e.g., a rack of shirts or pants), a retailer's information system may perform actions, such as push personalized offers related to those specific products to customers' mobile devices or track the time the customers dwell near items (which could reflect a higher degree of interest in those items or that a customer is showrooming the items) and adapt the offers accordingly.

However, the above embodiments are based on a physical stores in which the retailers have control and are not amenable to home or office environments where individuals or businesses order products online. For instance, a facilities manager may be in charge of stocking and reordering office and food supplies for a company (e.g., for the supply room, pantry, etc.). The facilities manager may use manual methods to keep track of products to restock. This process is inefficient and often leads to items being out of stock.

More sophisticated inventory management systems tag each and every items in inventory with radio frequency tags. Each tag emits a unique signal for the specific item it is attached to. That tag is registered with the management system so the management system can automatically determine which items are within a certain area based on the signal emitted by that tag. This allows users to identify the specific location of each item and track whether any items have been removed. However, these systems are extremely expensive and therefore typically only amenable to larger warehouses that have millions of items that need to be warehoused and tracked because the scale of these systems justifies the cost of the inventory management systems.

What is needed is an affordable for stocking and quickly reordering items that is easy for users, such as small businesses, to maintain and setup, and that does not require those users to undergo expensive training or maintain costly information technology infrastructure.

SUMMARY

According to one innovative aspect of the subject matter described in this disclosure, a computer-implemented method includes wirelessly receiving at a server via a computer network a unique identifier associated with a physical ordering device, the physical ordering device being remotely located from the server, retrieving, at the server from an information source, item information describing an item configured to be associated with the unique identifier of the physical ordering device, retrieving, at the server from the information source, shipping data including a physical location uniquely associated with the physical ordering device, generating at the server a purchase request for re-ordering the item, processing at the server the purchase request, authorizing at the server shipment of the item to the physical location associated with the physical ordering device responsive to the processing of the purchase request.

In general, according to yet another innovative aspect of the subject matter described in this disclosure may be embodied in a system that comprises one or more physical ordering devices distributed in one or more physical locations and electronically communicatively coupled to a computer network; and a server electronically communicatively coupled to the computer network, the server including one or more processors and one or more memories storing instructions that, when executed by the one or more processors, perform operations comprising wirelessly receiving at the server via the computer network a unique identifier associated with a physical ordering device of the one or more physical ordering devices, the physical ordering device being remotely located from the serve, retrieving, at the server from an information source, item information describing an item configured to be associated with the unique identifier of the physical ordering device, retrieving, at the server from the information source, shipping data including a physical location uniquely associated with the physical ordering device, generating at the server a purchase request for re-ordering the item, processing at the server the purchase request, and authorizing at the server shipment of the item to the physical location associated with the physical ordering device responsive to the processing of the purchase request.

These and other embodiments may each optionally include one or more of the following features and/or operations. For instance, that the physical ordering device is configured to order items associated with a zone of the physical location; that the physical ordering device includes a beacon configured to indicate a presence within the zone of the physical location; that the unique identifier is uniquely associated with the item; configuring the item to be associated with the unique identifier of the physical ordering device by linking, in the information source, the unique identifier with a quantity of the item based on a previous order of the item for the physical location; that the physical ordering device includes a user-actuateable input device; that the user-actuateable input device includes one or more of a button and a microphone, and in response to receiving an input signal indicating actuation of the input device, processing the input signal to generate the purchase request; that the user-actuateable input device includes a touchscreen device; that actuation of the user-actuateable input device causes a graphical user interface to be displayed, the graphical user interface displaying graphical elements representing a plurality of items associated with the unique identifier of the physical ordering device and a quantity of one or more of the plurality of items to re-order; wirelessly receiving, from the physical ordering device via a near-field communication network, the unique identifier associated with the physical ordering device, the client device being configured to communicate with the physical ordering device via the near field communication network; generating, at the client device, an order request at the client device including the unique identifier of the physical ordering device; and transmitting via the computer network the order request to the server.

In general, according to yet another innovative aspect of the subject matter described in this disclosure may be embodied in a system that comprises a physical ordering device including a housing, a wireless communications device mounted in the housing and configured to wirelessly transmit data to other nodes on a computer network, a processor mounted in the housing and programmed to transmit a signal including a unique identifier identifying the physical ordering device, the unique identifier being associated one or more items in an information source of an e-commerce platform; and a support having one or more receptacles configured to accept and detachably retain the housing.

These and other embodiments may each optionally include one or more of the following features and/or operations. For instance, that the physical ordering device includes a battery wired to the processor and wireless communications device, and the support is configured to charge the battery of the physical ordering device when the housing of the physical ordering device is retained within the one or more receptacles; that the physical ordering device is configured to order items associated with a zone of a physical location associated with the physical ordering device; that the physical ordering device includes a beacon configured to indicate a presence within the zone of the physical location; that the housing of the physical ordering device includes a user-actuateable input device, the user-actuateable input device being electronically communicatively coupled to the processor; that the user-actuateable input device includes a touchscreen device; that actuation of the user-actuateable input device causes a graphical user interface to be displayed, the graphical user interface displaying a graphical element representing the item associated with the unique identifier and enabling a user to order the item by interacting with the graphical element; that the ordering device is associated with a zone of a physical location and the graphical user interface displayed in response to the actuation of the user-actuateable input displays a plurality of graphical elements for items specifically associated with the zone; that actuation of the user-actuateable input causes the wireless device to transmit a signal to a client device, the signal causing the graphical user interface to be displayed on the client device; that the graphical user interface is displayed on a touchscreen device of the ordering device and configured to re-order a particular quantity of the item, the particular quantity being based on a previous order of the item at a physical location; and that the physical ordering device is a beacon, the beacon is inserted into and retained by one of the receptacles of the support, the support retains a plurality of additional beacons in a plurality of other receptacles, each of the additional beacons being associated with disparate items stockable in a zone of a physical location.

According to another innovative aspect of the subject matter described in this disclosure, a computer-implemented method includes wirelessly receiving, at a client device, a signal transmitted by a physical ordering device, the signal including a unique identifier unique identifier associated in an information source of an e-commerce platform with one or more items; displaying, at the client device, the item information describing the one or more items associated with the unique identifier of the physical ordering device; receiving, at the client device, user input from a user, the user input including a selection to order the one or more items; generating a purchase request for ordering the one or more items; and transmitting the purchase request from the client device to an e-commerce server.

These and other embodiments may each optionally include one or more of the following features and/or operations. For instance, receiving, at the client device from the e-commerce server, the item information, the information including a suggested quantity of the one or more items, the suggested quantity of the one or more items based on a previous order transmitted to the e-commerce server by the user; generating, at the client device, a form for providing or confirming payment information of the user based on a payment information request signal received from the e-commerce server; displaying, at the client device, the form for providing or confirming payment information; receiving, at the client device, a user input via the form for providing or confirming payment information; transmitting, from the client device to the e-commerce server, the form for providing or confirming payment information including the user input; receiving wireless signals from a plurality of physical ordering devices, the plurality of physical ordering devices including the physical ordering device; further comprising determining a zone in which the client device is located based on the wireless signals from the plurality of physical ordering devices; filtering unregistered physical ordering devices from the plurality of physical ordering devices to generate an active set of physical ordering devices; receiving, at the client device, item information describing items corresponding to the active set of physical ordering devices; displaying, at the client device, the item information describing the items corresponding to the active set of physical ordering devices; receiving, at the client device, a selection by the user to order one or more of the items corresponding to the active set of physical ordering devices; and transmitting, from the client device to the e-commerce server, the purchase request in response to receiving the selection to order one or more of the items corresponding to the active set of physical ordering devices.

Other innovative aspects include corresponding systems, methods, apparatus, and computer program products.

The disclosure is particularly advantageous over other existing solutions in a number of respects. By way of example and not limitation, the technology described herein enables a user to easily reorder items from an e-commerce system. In some embodiments the technology described herein enables a user to reorder items in a particular zone of a particular location using an ordering device configured to identify the items that belong within that zone. Further benefits can be seen in solutions to the problems presented in the background of this disclosure.

The features and advantages described herein are not all-inclusive and many additional features and advantages will be apparent to one or ordinary skill in the art in view of the figures and description. Moreover it should be noted that the language used in the specification has been selected for readability and instructional purposes and not to limit the scope of the inventive subject matter.

BRIEF DESCRIPTION OF THE DRAWINGS

The disclosure is illustrated by way of example, and not by way of limitation in the figures of the accompanying drawings in which like reference numerals are used to refer to similar elements.

FIGS. 1 and 2 depict a non-limiting example of ordering devices associated with different items.

FIGS. 9A-9I depicts example graphical user interfaces for ordering items.

DETAILED DESCRIPTION

Figure 3:
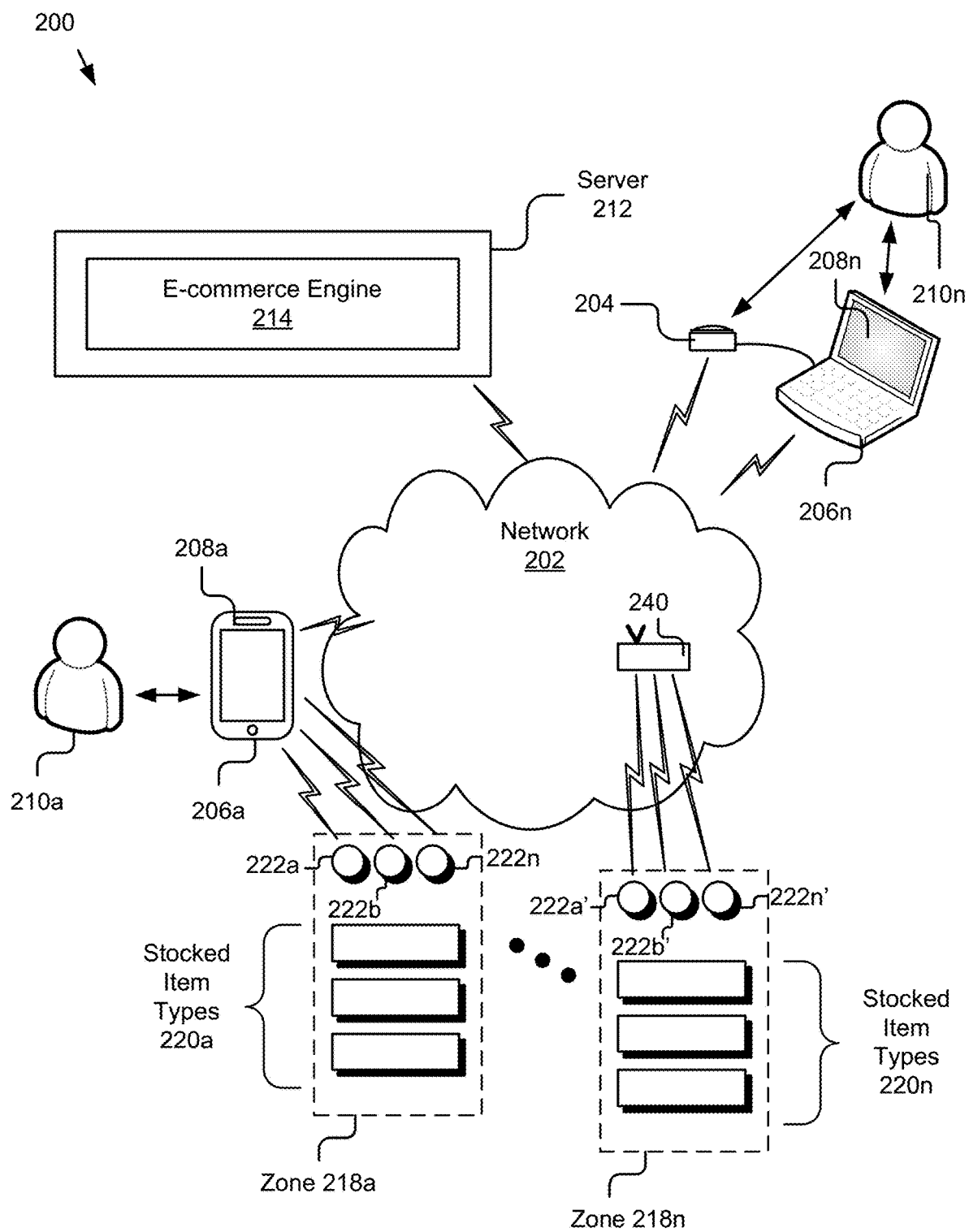
FIG. 3 is a block diagram of an example e-commerce system.

The technology disclosed in this application allows stakeholders, such as a person responsible for ordering and reordering items for an organization (e.g., business, family, etc.), to conveniently and easily track and reorder those items. In some embodiments, the technology uses beacons which may be included with the items when the items are shipped to the user or purchased by the user in-store. The technology may include one or more ordering devices configured to facilitate ordering or reordering of products. In some embodiments, an ordering device may include a beacon, dedicated button, or dedicated shopping computing device. For example, a beacon can be placed in a physical location near the item to which its ID is registered within a computer data store of an e-commerce system, and is configured to transmit its ID (e.g., via a network to a user's computing device or more directly to an e-commerce system to submit a reorder request for the item. In some embodiments, the technology disclosed in this application allows users to easily and conveniently (re)order items via an online marketplace using a different dedicated ordering device, such as a specialized button or interface (e.g., as illustrated and described in reference to FIGS. 1, 2, and 5A-7).

The techniques herein are described in terms of ordering devices and beacons, but it should be understood that the terms ordering devices and beacons may be used interchangeably and the techniques described herein are applicable to multiple types of ordering devices, as discussed throughout this disclosure. Additionally, an ordering device may include a beacon and/or a beacon may include features of an ordering device.

In some embodiments, a beacon can take any form that is suitable for the user to manipulate with his or her hands and/or visually identify. FIGS. 1 and 2 depict a non-limiting example of an ordering device. In particular, FIGS. 1 and 2 depict a non-limiting example of a set of beacons 100 associated with different items. The depicted set includes beacons 100a, 100b, and 100c. By way of further example and not limitation, beacon 100a is associated with a 1 lb bag of X-Brand French Roast Whole Bean Coffee; beacon 100b is associated with a 24 pack of Y-Brand granola bars and beacon 100c is associated with a 24 box variety pack of Z-Brand cereal. In this example, these items are regularly stocked in a pantry of the business and the beacons 100a, 100b, and 100c reflect the stock items.

The beacon may include a processor and a non-transitory memory storing instructions that are executable by the processor to transmit the beacon's corresponding ID and/or other information to devices within the beacon's transmission field. In some embodiments, the beacon may transmit the ID using Bluetooth® or other standard near-field communication protocols. As a further non-limiting example, the beacon may include an iBeacon™

As shown, the beacons 100a, 100b, and 100c may be mounted in a hanger 110 that can be hung in any orientation (e.g., horizontally, vertically, etc.) from any surface using any suitable fastener, such as an adhesive, hook and loop, snaps, etc. The hangar may include correspondingly sized mounts 112 (e.g., 112a, 112b, 112c, 112d, and 112e) for the beacons 100. For example, as shown, the beacon 100a may be mounted in the mount 112a, etc. In some embodiments, a beacon 100, such as beacon 100a and/or the mount 112a, may include one or more retainers to retain the beacon 110a in the mount 112a. For example but not limitation, as shown in FIG. 2, the mount 112a may include one, two, or more protrusions 114a and the beacon 108 may include one or more compatible recesses 116a that mate when the beacon 100a is mounted in the mount 112a. However, it should be understood that any other suitable coupling device could be used to couple the beacons 100a, 100b, and 100c in the mounts 112.

In the depicted example, the beacons 100a, 100b, and 100c can easily be removed from the hanger 110 by unmounting the hanger 110 from the surface to which it is mounted and pushing the beacons 100a, 100b, and 100c out of the corresponding mounts from behind using a finger or another suitable object. Although, it should be understood that other methods of removing the beacons 100 are also contemplated.

While the hanger 110 is depicted as including five mounts 112 in series, it should be understood that the hanger 110 may include any number of mounts 112 arranged in any sort of pattern. In addition, while the beacons 100 and mounts 112 are depicted as being circular in nature, it should be understood that any suitable shape, geometry, thickness, and/or materials may be used for the beacons 100 and the hanger 110.

In some embodiments, the hanger 110 may include and/or may be wired to a battery or other power source and include a power module for powering and/or charging the beacons. For example, the power module may include charging components, such as a transformer, power regulator, and/or other electrical components transforming the input power source to appropriate an output power source for recharging the battery(ies) of the beacons 100. This is advantageous as it can extend the battery life of the beacons 100 as they are mounted in and held by the hanger 110. Other variations are also possible, such as but not limited one where the beacons 100 may not include their own batteries but may effectively be plugged into the hanger 110's power source when mounted on the hanger 110.

In some embodiments, the hanger 110 may include a contoured area 122 on its side to enable the hanger 110 to be joined with or placed adjacent to one or more additional hangers. In some instances, the contoured area 122 may include conductive contacts such that the hanger 110 can provide power and/or communicate with one or more additional hangers. Similarly, the hanger 110 may include a second contoured area 124 to allow the hanger 110 to be joined with or placed adjacent to one or more additional hangers.

FIG. 3 is a block diagram of an example e-commerce system 200. The system 200 includes an e-commerce server 212, any number of client devices 206a . . . 206n (also simply referred to as 206 herein) that can be interacted with by users 210a . . . 210n, any number of ordering devices 204, and any number of zones 218a . . . 218n (also simply referred to as 218 herein).

A zone 218, such as zone 218a, includes one or more types of stocked items 220a and one or more beacons 222a, 222b, . . . 222n. More particularly, each type of stocked item 220a in the zone 218a may be associated with a corresponding beacon 222a, 222b, or 222n. Similarly, zone 218n also includes a set of different types of stocked items 220n and a set of corresponding beacons 222a', 222b', and 222n'. The beacons 222a, 222b, . . . 222n, and 222a', 222b', . . . 222n', may be referred to simply as 222 herein.

Figure 8:
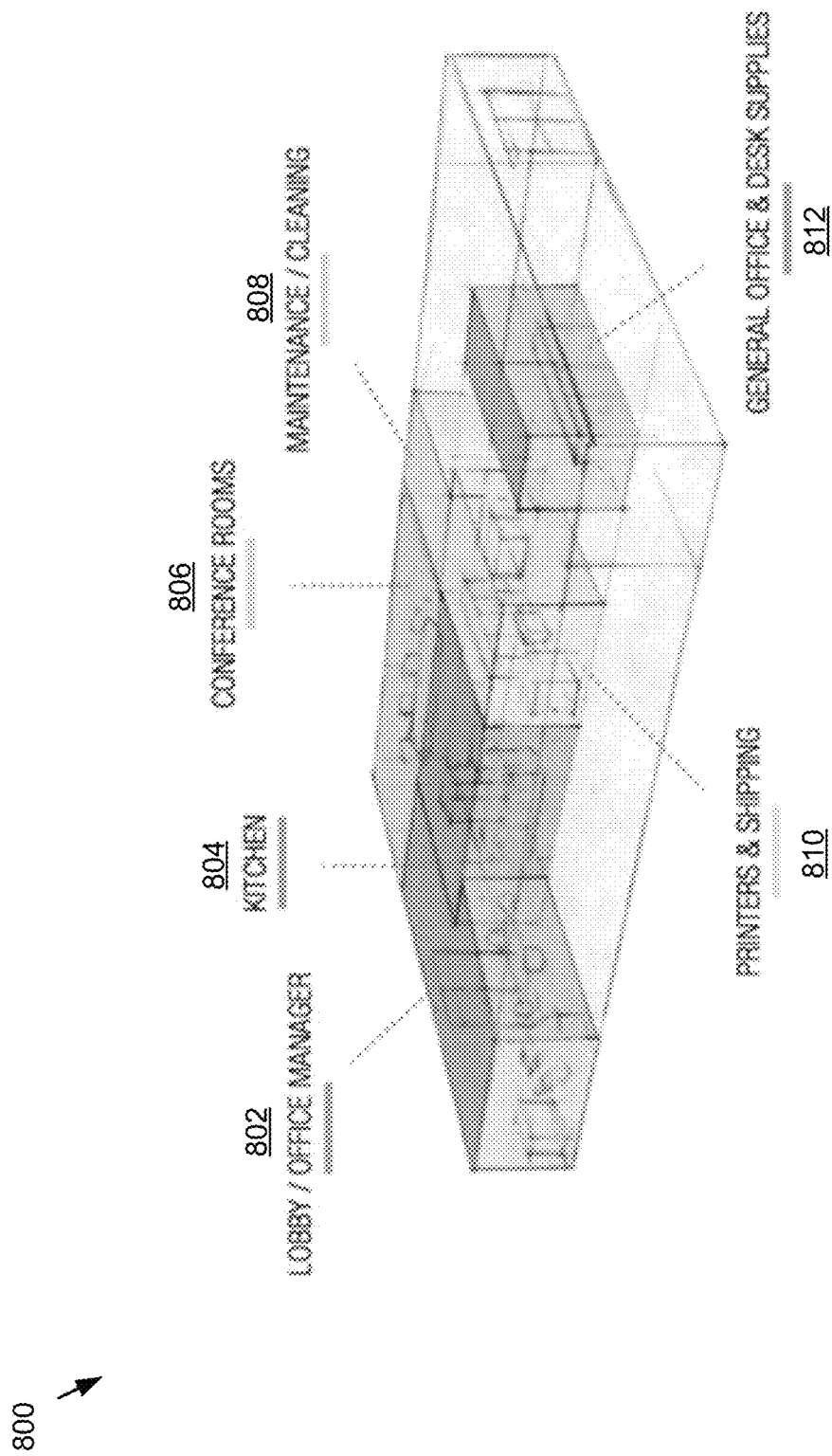
FIG. 8 is an illustration of an example office space including a plurality of zones.

FIG. 8 is an illustration of an example office space 800 including a plurality of zones 218. The example office space depiction 800 includes zones 218 corresponding to a lobby 802, a kitchen 804, a conference room 806, a maintenance closet 808, a printing area 810, and an office supplies area 812, although additional, fewer, or different zones are possible. The zones 802-812 are categorized by different types of products that may be stored and/or used in each zone. For example, in the kitchen 804, the products may include snacks rather than, for example, pencils, which would likely be included in the office supplies area 812. As described elsewhere herein, these zones can each include different beacons and/or ordering devices that enable products in those areas (e.g., within a threshold range of the beacons) to be easily (re)ordered using the techniques described herein.

Returning to FIG. 3, the beacons 222 are configured to communicate electronically with other components of the e-commerce system 200 to provide information about the different types of stocked items they represent. In some embodiments, one or more beacons 222 may communicate electronically with a mobile device 206 of a user 210. For example but not limitation, the beacons 222a, 222b, . . . 222n transmit certain information, such as an item ID, associated with the disparate items they represent to the mobile device 206a, and the beacons 222a', 222b', . . . 222n' transmit certain information associated with the item types they represent to the access point 240, as discussed further below with reference to at least FIGS. 4A and 4B.

The ordering device 204 may include a user-actuateable beacon (e.g., such as 100 and or 222) and/or a computing device having data processing and communication capabilities. In some embodiments, the ordering device 204 may include a processor (e.g., virtual, physical, etc.), a memory, a power source, a communication unit (e.g., network interface(s)), one or more sensors, one or more i/o devices (display, keyboard, camera, etc.), and or other software and/or hardware components (e.g., firmware, operating systems, drivers, and various physical connection interfaces (e.g., USB, HDMI, etc.), etc.). The ordering device 204 is configured to communicate electronically with other components of the e-commerce system 200, such as the e-commerce engine 214 and/or a client device 206, via the network 202 using a wireless and/or wired connection.

The ordering device 204 may include a communication unit, which may include one or more interface devices (I/F) for wired and/or wireless connectivity with the network 202 and/or other computing devices. The communication unit may include geo-location transceivers (e.g., GPS) for receiving and providing location information for the corresponding device, and the like. Geolocation data may also be determined by the ordering device 204, the data processing components of the network 202, the client device 206, and/or the e-commerce engine 214, using other suitable radio frequency (RF) location methods (based on IP address, MAC address, RFID, Wi-Fi™ positioning, device fingerprinting, etc.).

The ordering device 204 and/or client device 206 may be programmed with an instance of an e-commerce application 208. The e-commerce application 208 may be storable in a memory and executable by a processor of an ordering device 204 to provide for user interaction, receive user input, present static and/or dynamic information to the user via a display, and send data to and receive data from the other entities of the system 200 via the network 202.

The client devices 206 are computing devices having data processing and communication capabilities. In some embodiments, a client device 206 may include a processor (e.g., virtual, physical, etc.), a memory, a power source, a communication unit (e.g., network interface(s)), and/or other software and/or hardware components, such as a display, graphics processor, wireless transceivers, keyboard, camera, sensors, firmware, operating systems, drivers, and various physical connection interfaces (e.g., USB, HDMI, etc.). The client devices 206 may couple to and communicate with one another and the other entities of the system 200 via the network 202 using a wireless and/or wired connection.

Examples of client devices 206 may include, but are not limited to, mobile phones (e.g., feature phones, smart phones, etc.), tablets, laptops, desktops, netbooks, server appliances, servers, virtual machines, TVs, set-top boxes, media streaming devices, portable media players, navigation devices, personal digital assistants, etc. While two or more client devices 206 are depicted in FIG. 2, the system 200 may include any number of client devices 206. In addition, the client devices 206a . . . 206n may be the same or different types of computing devices.

The client devices may include a communication unit, which may include one or more interface devices (I/F) for wired and/or wireless connectivity with the network 202 and/or other computing devices. For instance, the communication unit may include, but is not limited to, wireless transceivers for sending and receiving signals using Wi-Fi™, Bluetooth®, IrDA™, Z-Wave™, ZigBee®, cellular communications, close-proximity/personal area (e.g., Bluetooth®, NFC, etc.) signals, and the like, etc.; CAT-type interfaces; USB or other suitable interfaces; various combinations thereof; etc. The communication unit may also include geo-location transceivers (e.g., GPS) for receiving and providing location information for the corresponding device, and the like. Geolocation data may also be determined by the client device 206, the data processing components of the network 202, and/or the e-commerce server 212, using other suitable radio frequency (RF) location methods (based on IP address, MAC address, RFID, Wi-Fi™ positioning, device fingerprinting, etc.).

The client devices 206a . . . 206n may include instances of an e-commerce application 208a . . . 208n (also simply referred to as 208 herein), respectively. The e-commerce application 208 may be storable in a memory and executable by a processor of a client device 206 to provide for user interaction, receive user input, present static and/or dynamic information to the user via a display, and send data to and receive data from the other entities of the system 100 via the network 102.

In some embodiments, the e-commerce application 208 may utilize the communication unit of the client device 206 on which it is operating to sense IDs of beacons 222 and/or 222' located within an applicable transmission range (e.g., zone 218) and/or communicate with ordering devices 204. As discussed further elsewhere herein, the e-commerce application 208 may sense the IDs of beacons 222 and/or 222' and retrieve relevant contextual information (e.g., item information) corresponding to the IDs of beacons 222 from a local and/or remote information source, such as a memory and/or the e-commerce engine 214.

The e-commerce application 208 is executable by the client devices 206 to receive and process information from ordering devices and/or beacon information from the beacons 222 to request and receive information from the e-commerce server 212, generate user interfaces and provide them for display via the screen of the corresponding client device 206, receive and process user input, etc., as discussed in further detail elsewhere herein. Non-limiting examples of the types of interfaces, acts, and/or functionality of the e-commerce application 208 are provided elsewhere herein, for example, in reference to FIGS. 5-9I.

The e-commerce application 208 may be executable by the ordering device 204 to request and receive information from the e-commerce server 212, generate user interfaces and provide them for display an i/o device (e.g., touchscreen) of the ordering device 204, receive and process user input from an i/o device (e.g., touchscreen), etc., as discussed in further detail elsewhere herein (e.g., in reference to FIGS. 5A-5J).

In some embodiments, the e-commerce application 208 may be location-aware. For instance, the e-commerce application 208 may track the location of the user 210's client device 206 and/or ordering device 204 based on geolocation data (e.g., GPS, etc.) collected by a communication unit of the client device 206 and provided to location-aware e-commerce application 208. Other variations are also possible.

In some embodiments, the e-commerce application 208 is code operable in a web browser, a native application (e.g., mobile app), a combination of both, etc. Additional structure, acts, and functionality of the client devices 206 and the location-aware e-commerce application 208 are described in further detail below.

The network 202 may include any number of networks and/or network types, and may couple the e-commerce server 212, the client devices 206, and/or the beacons 222, 222', and/or ordering devices 204 for wired and/or wireless electronic communication. The network 202 may include, but is not limited to, one or more local area networks (LANs), wide area networks (WANs) (e.g., the Internet), virtual private networks (VPNs), mobile (cellular) networks, wireless wide area network (WWANs), WiMAX® networks, near-field and micro communication networks (e.g., Bluetooth®, NFC, etc.), peer-to-peer networks, other interconnected data paths across which multiple devices may communicate, various combinations thereof, etc.

In some embodiments, the system 200 may include a dedicated ordering device 204. For example, an ordering device 204 may include a user-actuateable beacon (e.g., easy button), which may be coupled to the network 202 and/or the computer device of a user such as the client device 206n and the user 210n. In some embodiments, the ordering device 204 (e.g., smart easy button) is user-actuateable and includes virtual buttons and menus configured to quickly access products for the user to order. Actuation of the virtual buttons and menus transmits an actuation signals from the ordering device 204 to the e-commerce server 212.

The ordering device 204 may include a physical or virtual switch actuateable by the user 210n. Actuation of the ordering device 204 transmits an actuation signal from the ordering device 204 (e.g., the beacon, as described elsewhere herein) to the client device 206 and/or e-commerce server 212 to which it is wirelessly or wiredly coupled. The actuation signal may include data identifying the user to which the specific ordering device 204 is registered. For example, upon obtaining the ordering device 204, the user 210 using the e-commerce application 208 may register the ordering device 204 by entering unique identifying information for the ordering device 204, such as hardware identifier or serial number, into a corresponding interface generated and displayed by the e-commerce application 208. The user may then submit the information in a request generated by the e-commerce application 208 to the e-commerce engine 214, and the e-commerce engine 214 may update the user profile of the user 210 stored in a data store of the e-commerce engine 214 with the unique device information of the ordering device 204.

In some embodiments, the actuation signal may include data identifying the user to which the specific ordering device 204 is registered. For example, upon obtaining the ordering device 204, the user 210 using the e-commerce application 208 may register the ordering device 204 by submitting unique identifying information associated with the ordering device 204, such as hardware identifier or serial number, in a request generated by the e-commerce application 208 to the e-commerce engine 214, and the e-commerce engine 324 may update the user profile of the user 210 stored in a data store of the e-commerce engine 214 with the unique device information of the ordering device 204.

Responsive to receiving the actuation signal from the ordering device 204, the client device 206 executes a module of the e-commerce application 206 configured to automatically authenticate the user; retrieve data describing items specific to the user, such as but not limited to items that the user is authorized to reorder (e.g., on an approved list of the business), frequently reorders, would be interested in reordering based on one or more user profile attributes (e.g., products similar to those the user has ordered in the past, products that are popular among other users having demographics similar to that of the user, etc.), products being promoted that day (e.g., daily deals), etc.; and generate and present an interface that includes the retrieved items and user-selectable elements allowing the user to immediately order and reorder items without having to manually pull up the items on his or her own.

In further embodiments, the user 210 may browse a product catalog for various products, select and purchase products, etc., using various graphical menu, navigation, and purchase options presented by the e-commerce application 208 on the screen of the ordering device 204 and/or client device 206. For instance, the user 210, using an interface (e.g., of the e-commerce application 208, as described in further detail elsewhere herein), may select one or more products for purchase and submit a request to purchase the products, and the e-commerce application 326 may generate and transmit a request to the e-commerce engine 214 which may receive, process, and fulfill the purchase request accordingly. In some cases, this allows the user to quickly and conveniently reorder items without having to manually pull up the items in a software application (e.g., a web browser), but by simply actuating the user-actuateable ordering device 304.

The e-commerce application 208 may automatically authenticate the user 210 using a suitable secure authentication protocol with the e-commerce engine 214. Additionally or alternatively, the e-commerce application 208 may have previously authenticated with the e-commerce engine 214, and may use the previously established tokens to securely communicate with the e-commerce engine when reordering the items selected by the user.

The e-commerce application 208 may retrieve the item information and or any other information from a local or remote repository. The item information under any other information may be cached retrieved in real-time from another information source coupled to the network 202 such as the e-commerce engine 214.

In some embodiments, a user can build a list of products using the e-commerce application 208 based on the signals from the beacons 222 and/or other ordering devices 204 of one or more zones 218 and share that list with other users. For example but not limitation, a person responsible for cleaning an office building may be located proximate to the cleaning room closet and may build a list of cleaning products that need to be reordered based on the beacon information being transmitted by the beacons corresponding to those products, and then share (e.g., select to transmit) the list with his/her supervisor who has the authority to order the products. Upon selecting to share a list with another user, using an electronic address associated with the other user, the e-commerce application 208 transmits the list to the e-commerce engine 214, which receives and relays the list using the electronic address to a client device associated with the supervisor (e.g., the supervisor's mobile device). For instance, the e-commerce engine 214 may transmit a push notification via the network 202 to the client device 206 of the supervisor using the electronic address, which may receive, process, and display the notification to the supervisor. The supervisor may tap on the notification, responsive to which, the e-commerce application 208 may open the list for display with options to immediately reorder the list of cleaning products and/or revise the list prior thereto.

The ordering device 204 can take numerous forms according the techniques described herein. Some embodiments of the ordering device 204 may include the beacons 100 or 222, a dedicated application (e.g., the e-commerce application 208, and/or another dedicated device. One such embodiment of an ordering device is depicted and described in reference to FIGS. 5A-5J and includes a series of graphical user interfaces that a user may utilize to re(order) items (also referred to as products).

Figure 5B:
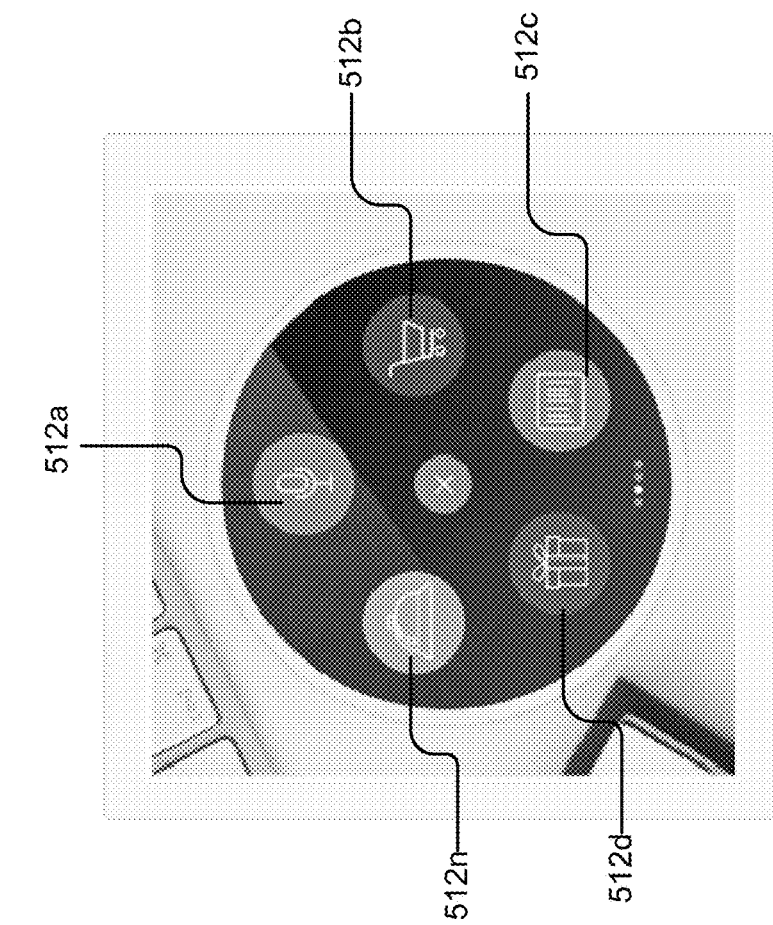
FIGS. 5A-5J are top views depicting one embodiment of an example ordering device and associated graphical user interface.
Figure 5A:
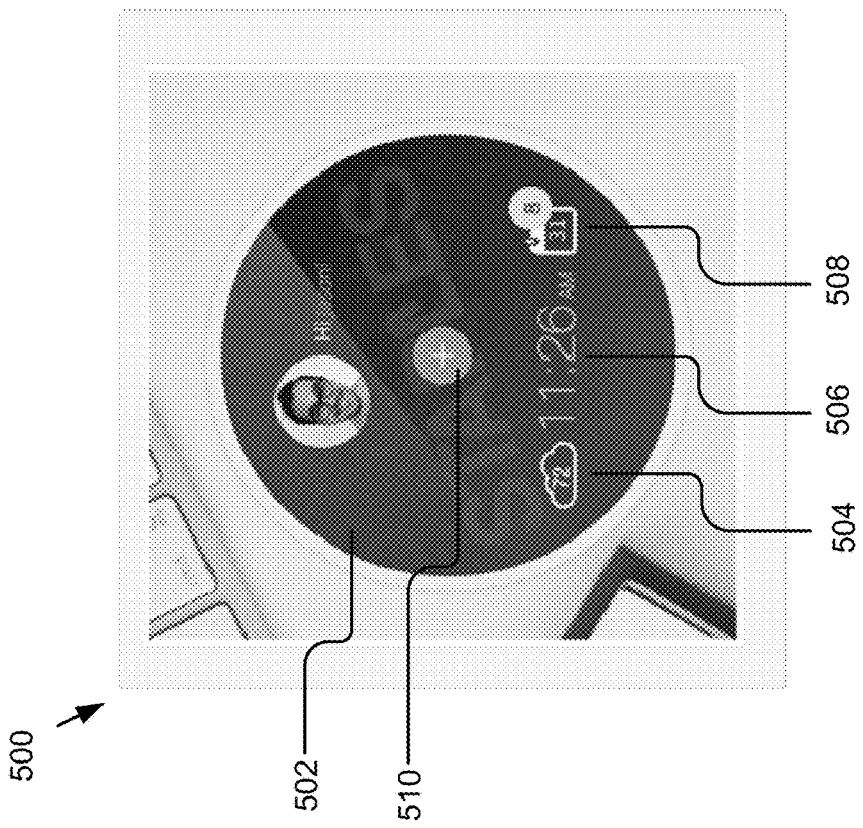

FIG. 5A is top view 500 of one embodiment of an example ordering device 204. As shown, the example ordering device 204 has a canister shape with a top surface including a touchscreen 502 displaying contextual information, such as weather 504, time 506, and calendar 508 notifications. The ordering device may rest/be placed on a surface, such as a table or a desk, for easy access. The ordering device is wirelessly linked to a data network (e.g., via WiFi™, cellular data, or another wireless data connection) or to the client device 206. The user may access virtual controls to control the ordering device via the touchscreen.

The ordering device 204 depicted in FIG. 5A showing contextual information and an enter button 510 for accessing the virtual marketplace to (re)order items and/or perform other actions. Upon selecting the enter element, the e-commerce application instructs the ordering device to generate and display the menu depicted in FIG. 5B, which includes graphical buttons 512a . . . 512n associated with various procedures that the ordering device is configured to execute. For example, the menu includes a microphone button 512a, a shopping cart button 512b, a settings button 512c, a daily deals button 512d, and an alert button 512n (also simply referred to herein as 512).

Figure 5D:
Figure 5C:
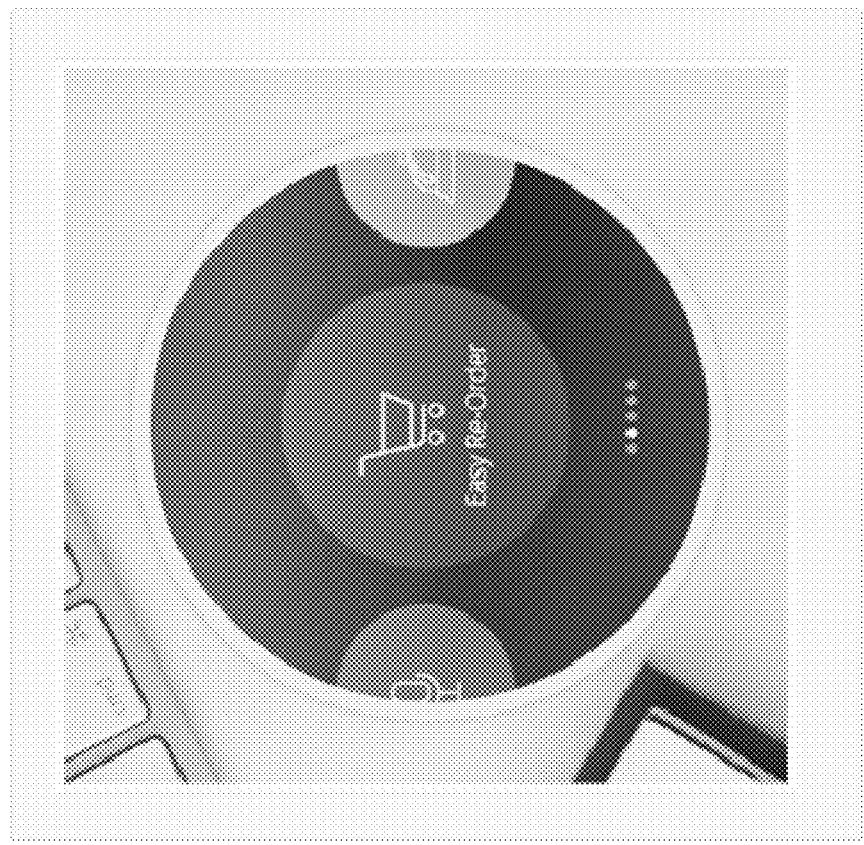

In some embodiments, the ordering device 204 may include the same or similar buttons 512 as shown in FIG. 5B, but may be organized in a ribbon or swipeable interface, as illustrated in FIG. 5C. The buttons 512 may be swiped in one direction (e.g., horizontally or vertically) in order to find and select one of the buttons 512.

Figure 5F:
Figure 5E:

Responsive to the selection of the microphone button 512a, the e-commerce application 208 instructs the ordering device 204 to capture a voice command. More specifically, as shown in FIGS. 5D-5F, the e-commerce application 208 instructs the ordering device 204 to display a graphical interface prompting the user to speak the voice command, and once detected using the microphone and a detection module, displays a graphical interface indicating the status of processing the command (e.g., "Processing your request . . . "), and a confirmation graphical interface confirming the voice command has been executed. In some embodiments, the user may utilize voice commands to conveniently reorder items without having to bother with traversing through the different interfaces typically involved with reordering items. In other embodiments, the user may utilize voice commands to find certain items and then complete the purchase using the interfaces described herein; or setting an alert by dictating the alert parameters.

For example, FIG. 5D shows, on the interface of the ordering device 204, that the ordering device 204 is listening to audio. FIG. 5E shows progress of the processing of the request of FIG. 5D. FIG. 5F shows a confirmation that the product has been ordered and/or added to a shopping cart.

Figure 5H:
Figure 5G:

Responsive to the selection of the alert button 512n, the user may set the parameters for triggering the alert (e.g., a price threshold associated with an item, a timer, etc.), and upon satisfaction of the parameters, the e-commerce application will trigger the alert, which may result in a notification interface being displayed, such as the one shown in FIG. 5G.

Responsive to the selection of the shopping cart button 512b, the e-commerce application 208 instructs the ordering device 204 to generate and display the first of a list of relevant products in a products interface. The relevant products may selected from a tracked list of products that the user frequently reorders. For instance, the e-commerce engine 214 may automatically track the items routinely ordered by the user and provide the list of items to the user for traversal and reorder. In further embodiments, the e-commerce engine 214 may group the items into categories on the user's behalf, which the user can then select and deselect in a manner similar to that of promotional items, as shown in FIG. 5J.

As shown in FIG. 5H, the details about the item may be centered in and fill the screen. Because the ordering device has a small screen, the user can navigate through the different items of the list using a certain command, such as a swipe gesture. For example, the user may swipe on the touchscreen vertically upward or downward to traverse back or forth through the list.

Once a desired item is displayed prominently on the screen, the user can order the item by inputting a specific command associated with that action. For instance, the user may select (e.g., tap) the check button shown in FIG. 5H or may input a particular gesture (e.g., swipe left).

Figure 5I:
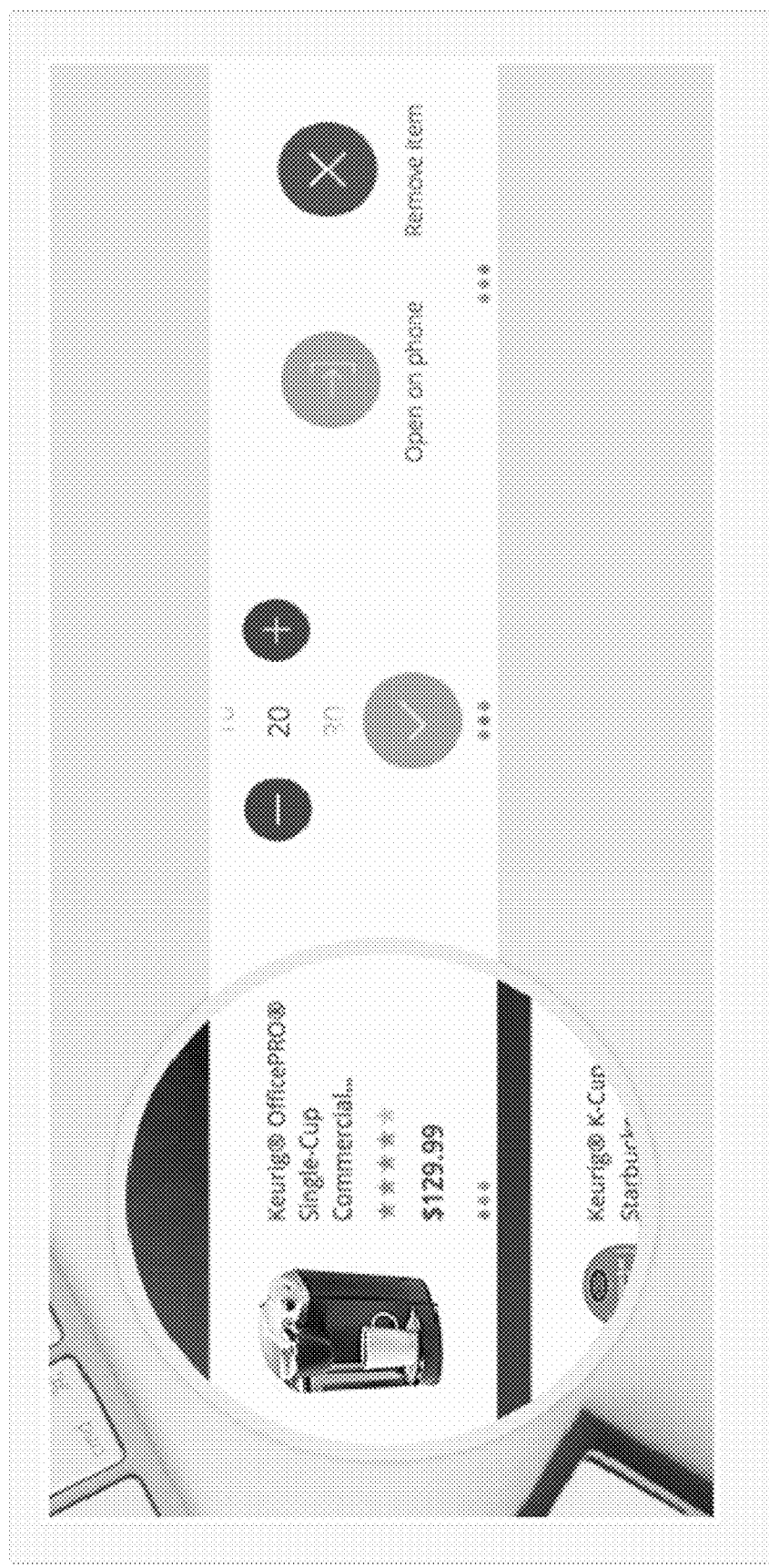
Figure 5J:

As shown in FIG. 5I, additional interfaces for performing actions associated with the displayed item may be accessed using one or more particular commands (e.g., selecting the check button, inputting a certain gesture, etc.). For example, the user may swipe left to access a second menu screen that provides the user with interface elements for setting the number of items the user wishes to (re)order and then confirm the order (e.g., by selecting the check mark button). The user may swipe left again to access a third menu screen providing the user with further options, such as opening the item in an application on the user's smartphone (e.g., browser, dedicated app, etc.), and a removal option for removing the item (canceling out of the transaction).

Responsive to selecting a daily deals button 512d, the e-commerce application 208 may instruct the ordering device 204 to generate and display an interface including a list of items under promotion. In some embodiments, the list may be displayed in the same manner under the shopping cart button described above. In a further example, the user may select a preference button for setting which groups of promotional items should be displayed to the user as depicted in FIG. 5J. For instance, the user may configure the groups of items that the user may want to see promotions for. These setting may then be transmitted to the e-commerce engine for storage and/or later retrieve and/or stored in a local cache for the same purpose.

Figure 6:
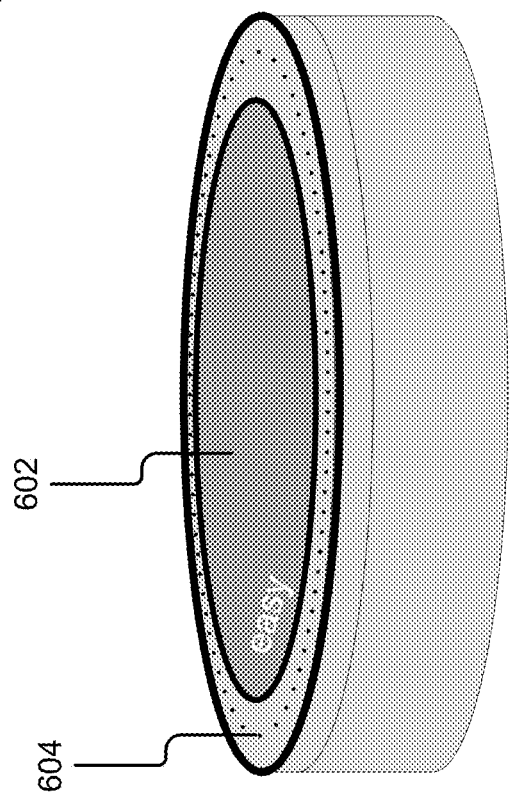
FIG. 6 depicts a non-limiting example of another embodiment of an ordering device.

FIG. 6 depicts a non-limiting example of another embodiment of an ordering device 204. The ordering device 204 depicted in FIG. 6 includes a user-actuateable button 602 and a microphone 604 (e.g., a single microphone or microphone array). When the button 602 is actuated, the microphone 604 records audio for processing and ordering of items in the same or similar way as is described above in reference to the microphone button 512a in FIG. 5.

Figure 7:
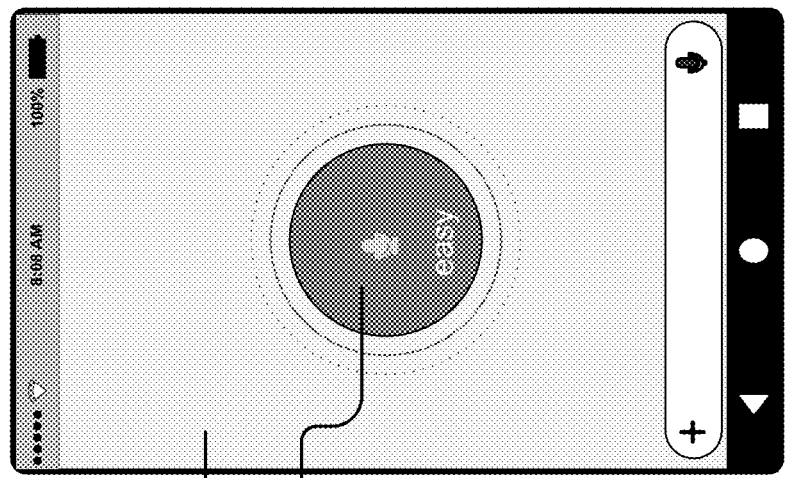
FIG. 7 depicts a non-limiting example of an embodiment of a graphical user interface of an e-commerce application.

FIG. 7 depicts a non-limiting example of an embodiment of a graphical user interface 702 of an e-commerce application 208. The graphical user interface 702 may be launched on the client device 206 by a user or it may be launched on the client device 206 in response to a signal received from an ordering device 204. For example, if a user actuates a button of an ordering device 204, the ordering device 204 may send a signal to a client device 206 (e.g., via Bluetooth, Wi-Fi, SMS, etc.) indicating to the client device 206 to launch the e-commerce application 208 and, in some instances, the graphical user interface 702. The graphical user interface 702 depicted in FIG. 7 includes a user-actuateable button 704 that, when actuated, causes a microphone of the client device 206 to record audio for processing and ordering of items in the same or similar way as is described above in reference to the microphone button 512a in FIG. 5.

Figure 4A:
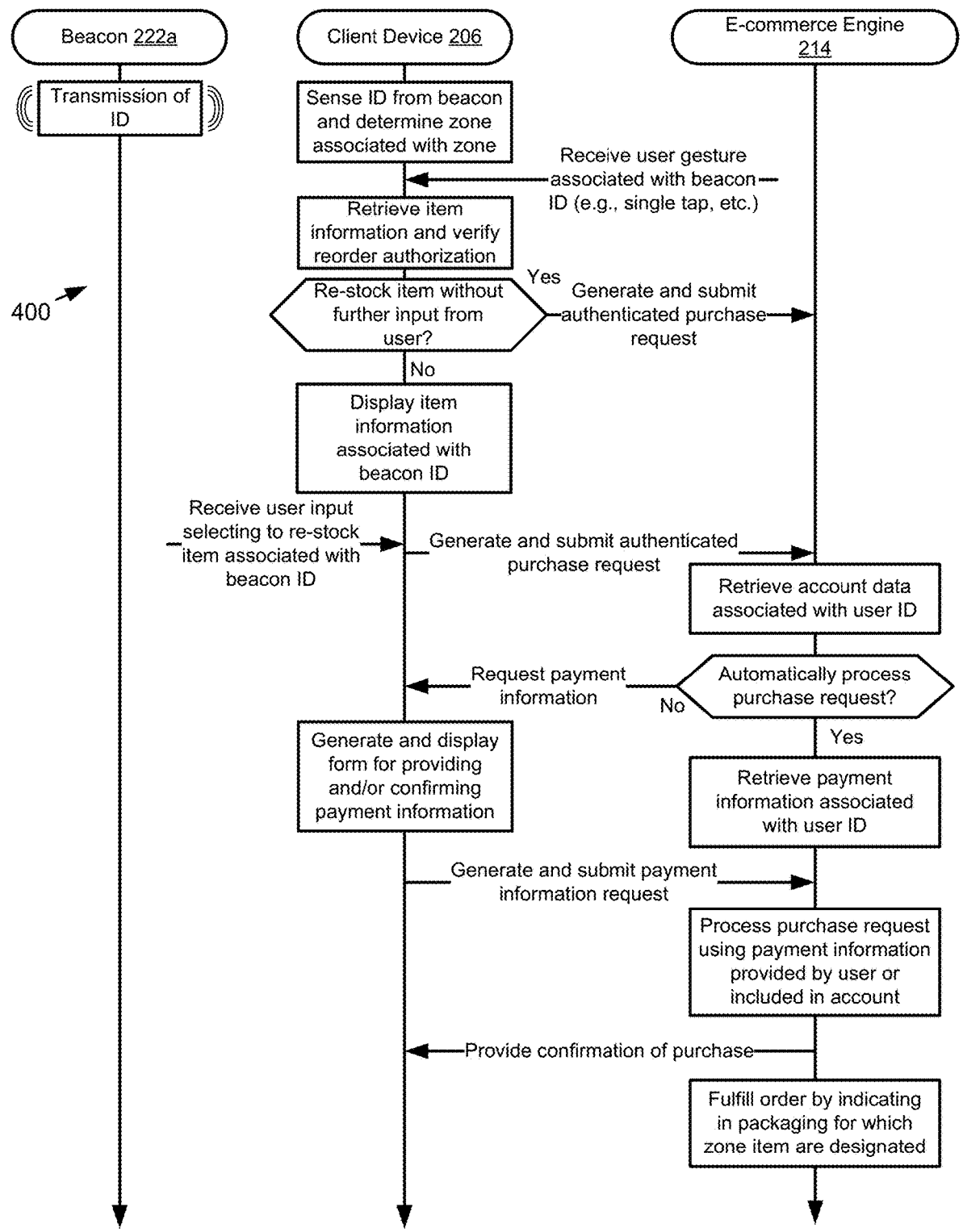
FIG. 4A is a signal diagram of an example method for re-ordering an item for a given zone based on the transmission signal of an ordering device corresponding to the item.

FIG. 4A is a signal diagram reflecting an example method 400 for re-ordering an item for a given zone based on the transmission signal of an ordering device or a beacon corresponding to the item. It should be understood that although the method 400 is described in reference to a beacon 222, it may also be applicable to any ordering device 204. In the method, the beacon 222 transmits data including the beacon 222's unique ID. The client device 206 senses the ID transmitted from the beacon 222. For example, the communication unit of the client device 206 may capture and process the data transmitted by the beacon 222 and provide the processed data to the e-commerce application 208, which in turn, may parse the beacon ID therefrom.

In some embodiments, the client device 206 may receive data describing a user gesture associated with the beacon ID. For example, the user may tap the client device 206 on or near the beacon 222, and responsive to sensing the tap using one or more sensors of the client device 206 (e.g., an accelerometer, a near-field sensor, etc.), the client device 206 may sense and process the ID transmitted by the beacon 222.

The client device 206 may then retrieve item data associated with the ID of the beacon 222. As discussed elsewhere herein, the beacon 222 is uniquely associated with an item that is offered for purchase on a virtual marketplace associated with the e-commerce engine 214 and/or from a physical retail store that is associated with a merchant that operates the e-commerce engine 214, such as the retailer Staples™

By way of further example, when the user orders an item (e.g., a product) using the virtual marketplace hosted by the e-commerce engine 214, the item is shipped to the user with a unique beacon 222 tied specifically to that item type (e.g., SKU, set of SKUs, etc.). The e-commerce engine 214 manages a database that stores data associating the different items with the beacons 222 to which they correspond. This database is accessible by the e-commerce application 208 and the various modules of the e-commerce engine 214 responsible for interacting with the beacons 222 and instances of the e-commerce application 208, etc., processing the purchase request, fulfilling the orders, etc.

In some embodiments, when a user first orders an item that has not yet been stocked in a particular zone 218, the user may indicate via a corresponding interface presented by the e-commerce application 208 or another suitable application, which zone 218 (e.g., room, etc.) the item being ordered will be stocked in once shipped and received by the merchant associated with the e-commerce engine 214. The e-commerce engine 214 may receive the data indicating the zone 218 specified by the user and associate the specified ID of the beacon 222 being shipped with the ordered item in the database. This conveniently allows the e-commerce engine 214, as well as the e-commerce application 208 which is associated with the e-commerce engine 218, to automatically indicate to the user which zone 218 the item should be stocked in. For example, when the user receives the item from the delivery service responsible for handling and shipping the item, the packaging including the item may include a packing slip that indicates the zone 218 in which the item should stocked, as reflected by the beacon-related information stored in the database.

In some embodiments, no zone 218 may have been previously indicated and the user may register the beacon 222 received with the ordered item upon receiving it using the e-commerce application 208. Further, as discussed and depicted elsewhere herein, the user using the e-commerce application 208 may manage (e.g., delete, add, rename, move, etc.) the zones 218 associated with his or her account as well as manage (e.g., delete, move, update, etc.) the beacons 222 associated with the various zones 218, etc.

With reference again to FIG. 4A, the method 400 may continue by retrieving item information for the item associated with the beacon ID and may then verify whether the user is authorized to reorder the item. In some embodiments, to perform this action, the e-commerce application 208 may determine whether the user has logged in to his or her account and, if not, may prompt the user via corresponding interface to provide his or her credentials and, upon receiving those credentials, may authenticate the user with the e-commerce engine 214 to determine the user's identity and permissions.

The e-commerce engine 214 may include a user database storing user accounts associated with the users. In some embodiments, the users may belong to an organization and may have differing permissions based on their position in that organization. For example, some users, such as a facilities manager, may be authorized to determine which products should be made available to the various members of the organization. Using an administrator interface presented by the e-commerce application 208 or another suitable application, the facilities manager may input and maintain certain restrictions for reordering items, which may include which specific products may be reordered, the frequency those products can be reordered, which users are authorized to reorder the products, etc. Upon entering this information, the e-commerce application 208 may transmit this information in a request to the e-commerce server 212, which may receive and process information and then store it in association with an organization account associated with the organization, in association with the specific user account of the facilities manager, and/or in association with the other user accounts and the items to which the restrictions apply. As a result, e-commerce application 208 may access permissions set by the facilities manager to determine whether or not the item associated with a beacon ID transmitted by a particular beacon 222 can be reordered by the particular user that is using the e-commerce application 208.

Next, the method 400 may determine whether the item can be restocked without further input from the user. In some embodiments, the item information and/or the permission information stored in association with the item may indicate whether the item can automatically be reordered, and if so, the e-commerce application 208 may automatically generate and transmit an authenticated purchase request to the e-commerce engine 214. Responsive to receiving the request, the e-commerce engine 214 may retrieve account data associated with a user ID included in the purchase request, retrieve payment information associated with the user ID, process the purchase request using the payment information from the account data, and then fulfill the order. As discussed elsewhere herein, in some embodiments, the e-commerce engine 214 may generate a document that indicates which zone the ordered item is designated for, as reflected in the item information stored in association with the item in the database.

As a further non-limiting example, the permissions set by the facilities manager or other suitable stakeholder may, in some cases, indicate whether an item can automatically be reordered or whether approval permission is required. If approval permission is required, the e-commerce application 208 may transmit an approval request to the e-commerce engine 214, which may receive the request and then generate and transmit a corresponding approval request to the client device 206 of the facilities manager or other suitable stakeholder requesting approval. The e-commerce engine 214 may determine which users have approval authority by accessing the permissions data associated with the organization in the database.

If the method 400 determines the item should not automatically restocked without further input from the user, the method 400 displays the item information associated with the beacon ID on the client device 206 via the e-commerce application 208. The item information may indicate details about that particular item, such as user reviews, photos, specifications, price, etc. In some embodiments, the item information may indicate whether the item is available for reordering this time, and if unavailable may indicate when the item may again be available for reorder. If available for reorder, the item information may indicate the quantity that may be reordered, the suggested quantity that should be reordered, or other suitable information related to the stocking of that item in the zone 218.

Assuming the item is available for reorder, the method 400 receives user input selecting restocked the item associated with the beacon ID and, responsive to receiving user input, generates and submits an authenticated purchase request to the e-commerce engine 214. The commerce engine 214 receives the authenticated purchase request and retrieves account data associated with the user ID. The method 400 then determines whether to automatically process the purchase request. For example, the account data may include a flag indicating to automatically process the purchase of the item using a particular payment account, such as a business account, personal account, particular credit card, an invoice account option, etc. If the account data indicates that the purchase request should automatically be processed, then the method 400 retrieves the payment information associated with user ID, processes the purchase request using the payment information, and then fulfills the order as discussed elsewhere herein.

Alternatively, if the account data does not indicate to automatically process the purchase request, the e-commerce engine 214 may generate and transmit a request requesting payment information from the e-commerce application 208 hosted by the client device 206. Responsive to receiving the request requesting the payment information, the e-commerce application 208 may generate and display a form for providing and/or confirming the payment information. In some embodiments, the account data associated with the user ID may include previously entered payment information (e.g., or credit card accounts, etc.) and the e-commerce application 208 may present that payment information in the form for confirmation and/or selection by the user. In some embodiments, the user may enter new payment information into the form.

Once the payment information has been entered and is confirmed, the user may submit the form and, responsive thereto, the e-commerce application 208 may generate a request including the entered payment information and/or confirming payment information and submit the payment information in a request to the e-commerce engine 214. The e-commerce engine 214 may receive a request including the payment information, parse the payment information from the request, process the purchase request using the payment information, and fulfill the order as discussed elsewhere herein.

Although the method 400 is described in the context of a single item, it should be understood that multiple items associated with multiple beacons 222 or ordering device(s) 204 may be ordered at the same time. In addition, while various operations depicted in FIG. 4A are described as being performed using the client device 206, it should be understood that the automated operations may be performed by another device such as the access point 240. For example, with reference to FIG. 3, the beacons 222a', 222b', ... 222n', may be communicatively coupled to an access point 240 and the access point may automatically request and reorder various items to restock the zone 218n. For example, based on certain preferences set by stakeholder, such as a facilities manager, which are stored in a database accessible by the e-commerce engine 214 and/or the access point 240, the items for that zone 218n may automatically be reordered.

In some instances, the beacons 222a', 222b', ... 222n', ordering device 204, and/or the access point 240 may include various logic described with reference herein to the e-commerce application 208, such as the acts of retrieving item information, verifying reorder authorization, determining to restock the item without further input from the user, and generating and submitting authenticated purchase requests to the e-commerce engine 214. Depending on the configuration, the access point may simply relay the requests generated by the beacons 222a', 222b', ... 222n' and/or ordering device 204 or may itself generate the requests based on the beacon IDs transmitted by the beacons 222a', 222b', ... 222n', although, other variations are also possible and contemplated.

Figure 4B:
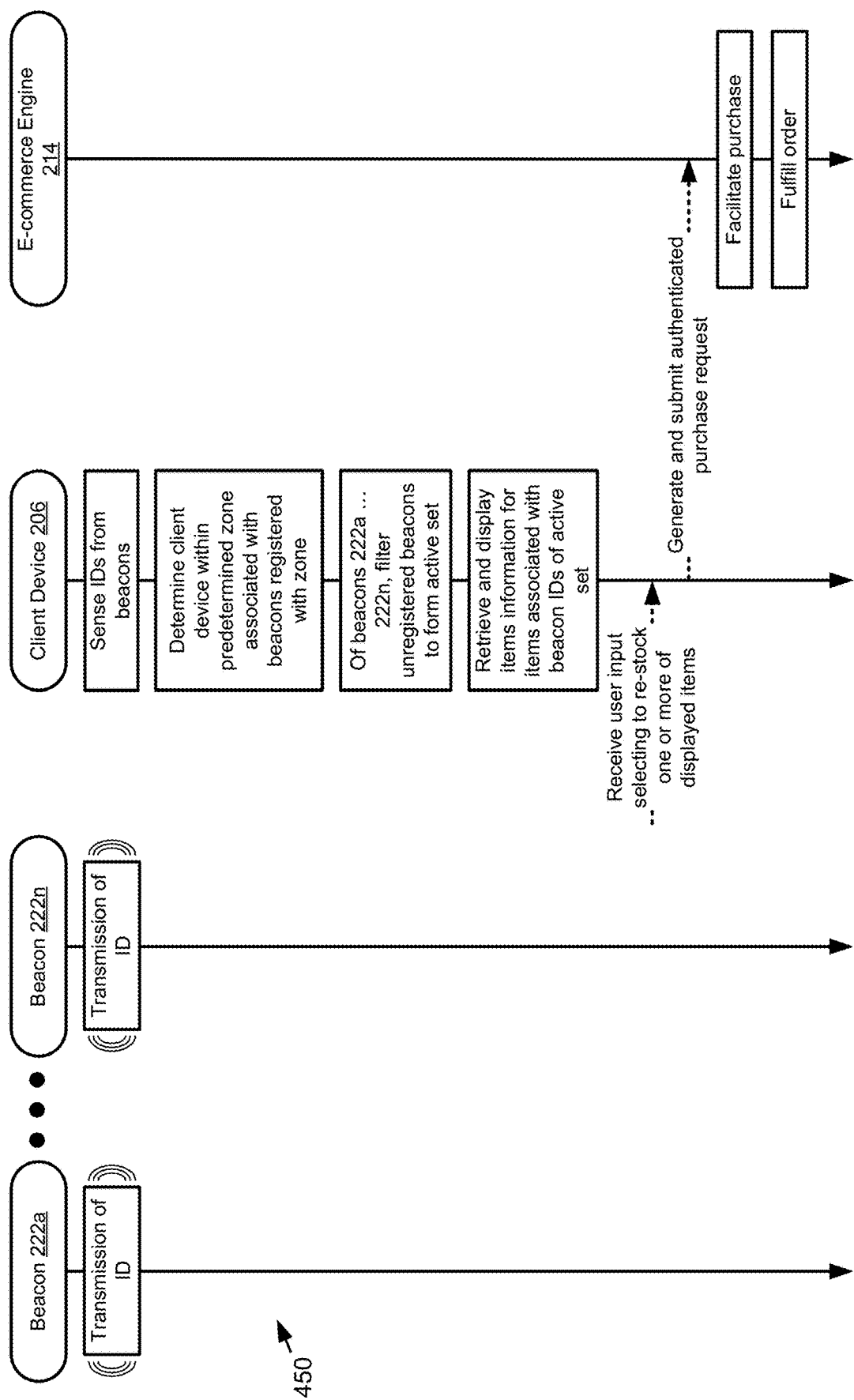
FIG. 4B is a signal diagram of an example method for re-ordering different items associated with different beacons.

FIG. 4B is a signal diagram reflecting a further example method 450 for re-ordering item(s) for a given zone based on the transmission signal of a corresponding ordering device(s). It should be understood that although the method 450 is described in reference to the beacon 222, it may also be applicable to any ordering device 204. In this method 450, beacons 222 ... 222n transmit data including the beacon IDs unique to the beacons. The client device 206 senses the ID transmitted from the beacon 222 as discussed elsewhere herein. The client device 206 also determines whether the client device 206 is located within a predetermined zone 218 associated with one or more specific beacons registered with that zone 218. Upon determining which zone 218 is applicable (e.g., where the client device 206 is located), method 450 filters out the beacons 222a ... 222n that are not registered with the zone 218 and thus forms an active set of beacons 222.

Next, the e-commerce application 208 retrieves and displays item information for the items associated with the beacon IDs of the active set. Information is displayed in the same or similar as that discussed elsewhere herein. The method 450 receives user input selecting to restock one or more of the displayed items, and responsive thereto generates and submits an authenticated purchase request for reordering those items. The e-commerce engine 214 receives the purchase request and facilitates the purchase and/or fills the order as discussed elsewhere herein.

FIGS. 9A-9I depict example graphical user interfaces (GUIs) of an e-commerce application 208. The GUIs described in FIGS. 9A-9I and corresponding e-commerce application 208 may be launched by a user by selecting the e-commerce application 208 from a list of applications on the client device 206. In other instances, the e-commerce application 208 may be launched upon actuation of an ordering device 204, as described herein. For example, the e-commerce application 208 may be launched to a particular interface displaying information for a particular zone 218 upon actuation of an ordering device 204 in that zone. In another example, the e-commerce application 208 may automatically display information for a particular zone 218 in which an ordering device 204 (e.g., a beacon 222) is located (e.g., as described elsewhere herein, the e-commerce application 208 recognizes the zone based on a beacon and loads the information for items in that zone).

FIG. 9A depicts an example GUI 900a for (re)ordering items. The GUI 900a includes graphical elements 902a, 902b, and 902n, each of which identify an item and a quantity of that item. The graphical elements 902a ... 902b may be automatically displayed depending on the zone 218 in which the client device 206 is located, for example, based on actuation of a particular ordering device 204 associated with that zone 218 or recognition of beacons 222 associated with that zone 218. For instance, the GUI 900a includes a zone indicator 906 of the zone 218, which in the depicted example corresponds to the kitchen.

Figures 9C, 9D, 9E:
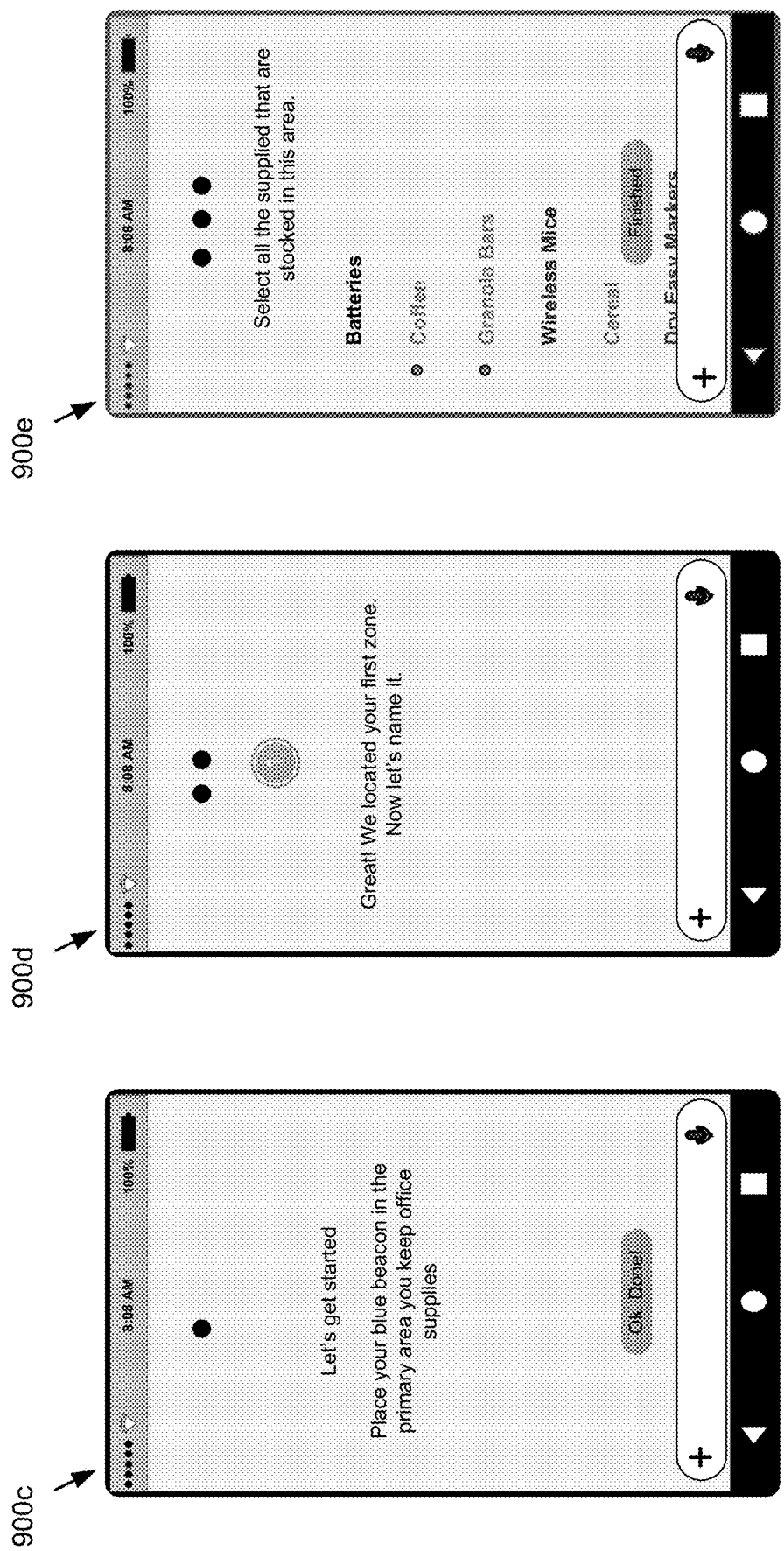
Figures 9F, 9G:
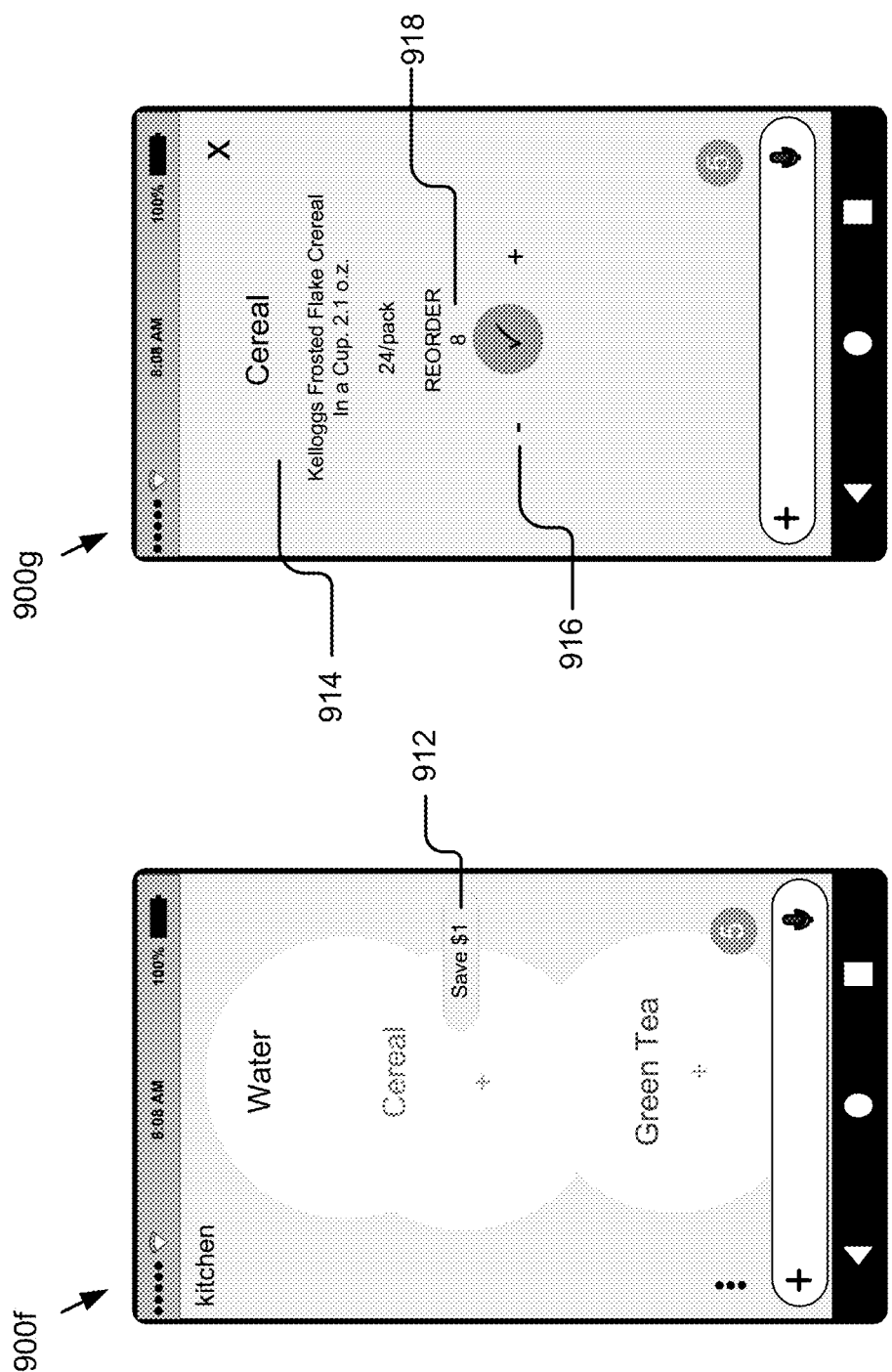

In one example, graphical element 902b illustrates a symbol 904 that maybe selected to change the quantity of the identified item in an order (e.g., as shown in reference to FIG. 9G). Additionally, the GUI 900a may include a bar 908 for adding new items to an order (e.g., via text or voice). For example, the bar 908 may receive text and, according the techniques described herein, the e-commerce application 208 may transmit the text to the e-commerce engine 214 for processing to determine the item and quantity of the item to be ordered. The items added to a particular order while the client device 206 may be remembered by the e-commerce application 208 and/or e-commerce engine 214 in association with that zone for future orders.

FIG. 9B depicts an example GUI 900b for viewing orders from various zones 218 and/or changing the order in those zones. For example, if the zone indicator 906 of FIG. 9A is selected, then the e-commerce application 208 may launch the GUI 900b, which displays graphical elements 910a ... 910n for each zone. In some embodiments, the graphical elements 910a ... 910n may identify the zone and the number of items in a current order (e.g., in a current digital shopping cart) for that zone. Further, in some instances, the graphical elements 910a ... 910n may be selected to view a list of items and order quantities of those items for the selected zone.

FIGS. 9C, 9D, and 9E depict example GUIs 900c, 900d, and 900e, respectively, for initiating a zone 218 with beacons 222 and/or other ordering devices 204. GUI 900c offers instructions for placing a beacon 222 in a particular zone. GUI 900d enables the user to name the zone and/or the beacon, and select which items are stocked in the zone, thereby enabling the user to create customized and dynamic zones. For example, a particular zone may combine elements of kitchen zone and an office supply zone.

FIG. 9F depicts an example GUI 900f including an offer of a discount. GUI 900f includes the same elements as GUI 900a, with the addition of a discount offer 912. The discount offer 912 can be dynamically determined for a particular item, user, zone, or workplace. For example, in one embodiment, the e-commerce application 208 may communicate with the e-commerce engine 214 to determine that a particular user has not ordered an item (e.g., cereal) for a threshold period of time or quantity of orders, so in order to incentivize the user to purchase that item, a discount may be provided. In the event that the user selects the item and/or discount, the e-commerce application 208 may display the GUI 900g, as shown in FIG. 9G.

FIG. 9G depicts an example GUI 900g for ordering additional items. In the depicted example, the GUI 900g identifies the details of a product (e.g., brand, size, quantity, etc.) 914 and provides a method to increase or decrease the quantity in the order 916. In some embodiments, the e-commerce application 208 and/or e-commerce engine 214 automatically chooses and displays a personalized quantity 918 of an order for the user, for example, based on a quantity of a most recent order, an average quantity of previous orders, a projected need based on past orders and order frequency, etc.

Figure 9I:
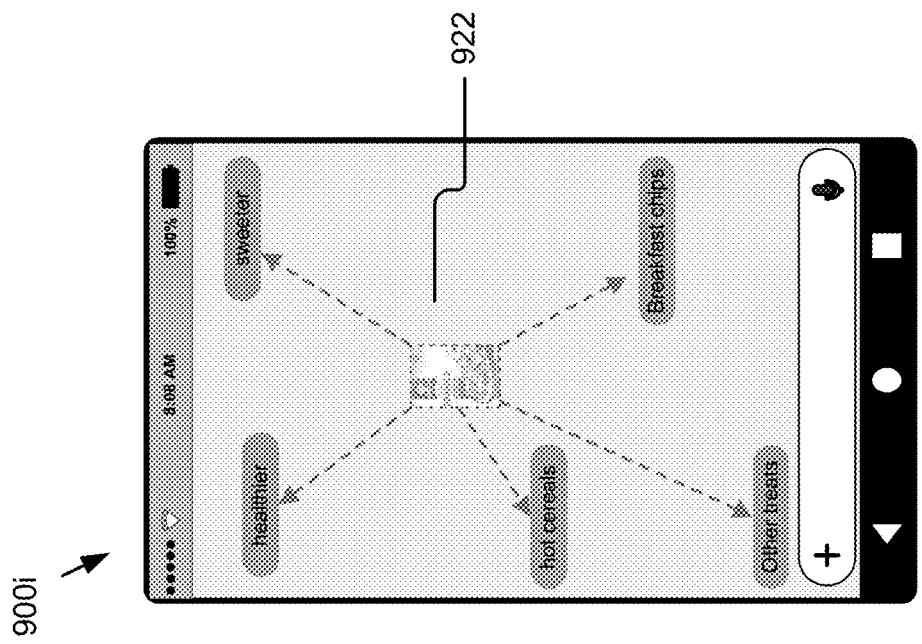
Figure 9H:
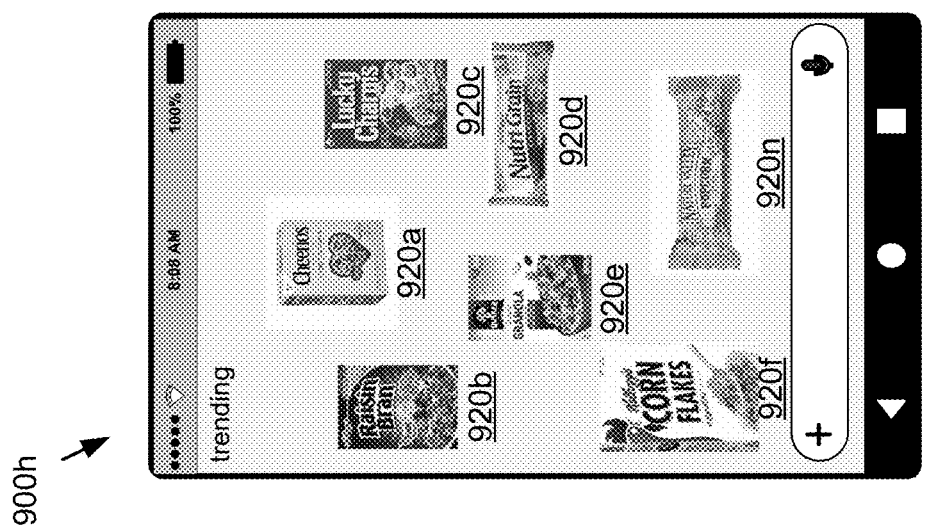

FIG. 9H depicts an example GUI 900h showing trending items in a particular category. For example, at a GUI, such as the GUI 900a of FIG. 9A, a user may hold (e.g., select for a threshold time period) a graphical element associated with an item, upon which the e-commerce application 208 launches the GUI 900h. The GUI 900h shows graphical depictions 920a . . . 920n of a set of popular or trending items in the same category as the selected item. For example, if a user were to select and hold a breakfast cereal, suggested items related to breakfast cereals or breakfast items would be displayed.

FIG. 9I depicts an example GUI 900i for navigating the suggested items displayed in GUI 900h of FIG. 9H. In the depicted example, a user may swipe or drag (e.g., slide a finger or cursor over) the GUI 900h in any direction to narrow the displayed suggested items according to a certain themes or criteria, where each direction corresponds to a certain criteria. In the depicted example, if a user drags the GUI 900h to move toward the top left, increasingly healthy breakfast items will be displayed. In some embodiments, the user may hold the GUI 900h to display the GUI 900i illustrating a guide 922 showing which direction corresponds to which criteria.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various embodiments are described as having particular hardware, software, and user interfaces. However, the present disclosure applies to any type of computing device that can receive data and commands, and to any peripheral devices providing services. Thus, it should be understood that a variety of different system environments and configurations are contemplated and are within the scope of the present disclosure. For instance, various functionality may be moved from a server to a client, or vice versa and some embodiments may include additional or fewer computing devices, services, and/or networks, and may implement various functionality client or server-side. Further, various entities of the described system(s) may be integrated into to a single computing device or system or additional computing devices or systems, etc. In addition, while the system 200 depicted in FIG. 3 provides an example of an applicable computing architecture, it should be understood that any suitable computing architecture, whether local, distributed, or both, may be utilized in the system 200.

In some instances, various embodiments may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various embodiments described herein may relate to a computing device and/or other apparatus for performing the operations herein. This computing device may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware embodiment, a software embodiment, or embodiments containing both hardware and software elements. For instance, the technology may be implemented in executable software, which includes but is not limited to an application, firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Communication unit(s) (e.g., network interfaces, etc.) may also be coupled to the system to enable the data processing system to become coupled to other data processing systems, storage devices, remote printers, etc., through intervening private and/or public networks, such as the network 202.

Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to embodiment in any specific programming language, or for any specific operating system or environment.

What is claimed is:

1. A system for ordering an item comprising:
a physical ordering device including
a housing,
a wireless communications device mounted in the housing and configured to wirelessly transmit data to other nodes on a computer network, and
a processor mounted in the housing and programmed to transmit a signal including a unique identifier identifying the physical ordering device, the unique identifier being associated one or more items in an information source of an e-commerce platform; and
a support having multiple receptacles, each of the multiple receptacles configured to accept and detachably retain the housing, the support configured to charge a battery of the physical ordering device when the housing of the physical ordering device is retained within the receptacle.

2. The system of claim 1, wherein the physical ordering device includes a battery wired to the processor and the wireless communications device, and the support is configured to charge the battery of the physical ordering device when the housing of the physical ordering device is retained within the one or more receptacles.

3. The system of claim 1, wherein the signal transmitted by the processor of the physical ordering device causes items associated with a zone of a physical location associated with the physical ordering device to be identified.

4. The system of claim 3, wherein the physical ordering device includes a beacon configured to indicate a presence within the zone of the physical location.

5. The system of claim 1, wherein the housing of the physical ordering device includes a user-actuateable input device, the user-actuateable input device being electronically communicatively coupled to the processor.

6. The system of claim 5, wherein the user-actuateable input device includes a touchscreen device.

7. The system of claim 5, wherein actuation of the user-actuateable input device causes a graphical user interface to be displayed, the graphical user interface displaying a graphical element representing the item associated with the unique identifier and enabling a user to order the item by interacting with the graphical element.

8. The system of claim 7, wherein the physical ordering device is associated with a zone of a physical location and the graphical user interface displayed in response to the actuation of the user-actuateable input device displays a plurality of graphical elements for items specifically associated with the zone.

9. The system of claim 7, wherein actuation of the user-actuateable input device causes the wireless communications device to transmit a signal to a client device, the signal causing the graphical user interface to be displayed on the client device.

10. The system of claim 7, wherein the graphical user interface is displayed on a touchscreen device of the physical ordering device and configured to re-order a particular quantity of the item, the particular quantity being based on a previous order of the item at a physical location.

11. The system of claim 7, wherein the physical ordering device is a beacon, the beacon is inserted into and retained by one of the receptacles of the support, the support retains a plurality of additional beacons in a plurality of other receptacles, and each of the additional beacons is associated with disparate items stockable in a zone of a physical location.

* * * * *